United States Patent
Lee et al.

(10) Patent No.: US 11,263,236 B2
(45) Date of Patent: Mar. 1, 2022

(54) REAL-TIME CROSS-SYSTEM DATABASE REPLICATION FOR HYBRID-CLOUD ELASTIC SCALING AND HIGH-PERFORMANCE DATA VIRTUALIZATION

(71) Applicant: SAP SE, Walldorf (DE)

(72) Inventors: Juchang Lee, Seoul (KR); Seoyoon Choi, Seoul (KR); Eunsang Kim, Seoul (KR); Kyu Hwan Kim, Seoul (KR); Joo Yeon Lee, Seoul (KR); Hyoung Jun Na, Seoul (KR)

(73) Assignee: SAP SE, Walldorf (DE)

( * ) Notice: Subject to any disclaimer, the term of this patent is extended or adjusted under 35 U.S.C. 154(b) by 191 days.

(21) Appl. No.: 16/686,827

(22) Filed: Nov. 18, 2019

(65) Prior Publication Data

US 2021/0149915 A1 May 20, 2021

(51) Int. Cl.
*G06F 16/27* (2019.01)
*G06F 16/23* (2019.01)
*G06F 16/22* (2019.01)

(52) U.S. Cl.
CPC ........ *G06F 16/273* (2019.01); *G06F 16/2282* (2019.01); *G06F 16/2379* (2019.01)

(58) Field of Classification Search
CPC .................................................. G06F 16/273
See application file for complete search history.

(56) References Cited

U.S. PATENT DOCUMENTS

| | | | |
|---|---|---|---|
| 8,301,593 B2 | 10/2012 | Hoffman et al. | |
| 2004/0133591 A1* | 7/2004 | Holenstein | G06F 11/2079 |
| 2005/0289186 A1* | 12/2005 | Guo | G06F 16/27 |
| 2014/0201725 A1* | 7/2014 | Tian | G06F 8/65 |
| | | | 717/169 |
| 2016/0147859 A1* | 5/2016 | Lee | G06F 11/1469 |
| | | | 707/615 |
| 2017/0177658 A1* | 6/2017 | Lee | G06F 11/1451 |

(Continued)

OTHER PUBLICATIONS

Extended European Search Report, EP Application No. 20195056.65-1231, dated Dec. 8, 2020, 7 pp.

(Continued)

*Primary Examiner* — Nan H Oberly
(74) *Attorney, Agent, or Firm* — Buckley, Maschoff & Talwalkar LLC

(57) ABSTRACT

RTR of a database transaction to a replica table may include receiving replication and transaction commit log entries (representing a database transaction). The replication log entry has a row-ID value, and the row at the replica table has a row-ID value. The replication log entry may be dispatched to a parallel log replayer and the associated transaction commit log entry to a transaction commit log replayer. The row-ID values may be compared, and the replication log entry is replayed at the parallel log replayer based on the comparison. The database transaction may then be committed to the replica table by replaying the associated transaction commit log entry at the transaction log replayer, wherein the database transaction is associated with row-level parallel replay having transactional consistency and DDL replication and reconstruction of a DDL statement at the replica system is associated with one or multiple metadata update log entries.

18 Claims, 21 Drawing Sheets

(56) References Cited

U.S. PATENT DOCUMENTS

2019/0294582 A1* 9/2019 Zhu .................... G06F 16/27
2019/0325055 A1* 10/2019 Lee ................. G06F 16/1734

OTHER PUBLICATIONS

Van Donselaar, Vincent, "Low latency asynchronous database synchronization and data transformation using the replication log", University of Twente, Master Thesis, Aug. 14, 2015, 47 pp.

* cited by examiner

REAL-TIME CROSS-SYSTEM DATABASE REPLICATION FOR HYBRID-CLOUD ELASTIC SCALING AND HIGH-PERFORMANCE DATA VIRTUALIZATION

BACKGROUND

An enterprise may use a database management system to handle a substantial number of database transactions. This may be the case, for example, when a database management system is used by insurance companies, financial services companies, e-commerce websites, etc. To help handle a large amount of database transactions, the database management system may distribute read transactions to replica tables at a replica node. Database management systems may maintain the replica tables by replicating changes from the source tables at a source node to the corresponding replica tables at the replica node. Replicating such changes, however, may be slow, especially when a source table is frequently updated. This may limit read transaction performance of the database management system and create a visibility gap between the source tables and replica tables.

In some cases, an Asynchronous Table Replication ("ATR") may efficiently facilitate such a process. The use of ATR, however, may be limited to replica tables that are located on the same landscape as the source table (e.g., are located on the same system and share the same database software). It may therefore be desirable to provide real-time cross-landscape database table replication in a secure, automatic, and accurate manner.

SUMMARY

RTR of a database transaction to a replica table may include receiving replication and transaction commit log entries (representing a database transaction). The replication log entry has a row-ID value, and the row at the replica table has a row-ID value. The replication log entry may be dispatched to a parallel log replayer and the associated transaction commit log entry to a transaction commit log replayer. The row-ID values may be compared, and the replication log entry is replayed at the parallel log replayer based on the comparison. The database transaction may then be committed to the replica table by replaying the associated transaction commit log entry at the transaction log replayer, wherein the database transaction is associated with row-level parallel replay having transactional consistency and DDL replication and reconstruction of a DDL statement at the replica system is associated with one or multiple metadata update log entries.

Some embodiments comprise: means for receiving, by at least one processor, a replication log entry and an associated transaction commit log entry, the replication log entry and the associated transaction commit log entry together representing a database transaction to be replayed to a row at a replica table, the replication log entry having a row-ID value and the row at the replica table having a row-ID value; means for dispatching, by the at least one processor, the replication log entry to a parallel log replayer and the associated transaction commit log entry to a transaction commit log replayer; means for comparing, by the at least one processor, the row-ID value of the replication log entry to the row-ID value of the row at the replica table; means for replaying, by the at least one processor, the replication log entry at the parallel log replayer based on the comparison; and means for committing, by the at least one processor, the database transaction to the replica table by replaying the associated transaction commit log entry at the transaction log replayer, wherein the database transaction is associated with row-level parallel replay having transactional consistency and DDL replication and reconstruction of a DDL statement at the replica system is associated with one or multiple metadata update log entries.

Some technical advantages of some embodiments disclosed herein are improved systems and methods to provide real-time cross-landscape database table replication in a secure, automatic, and accurate manner.

DETAILED DESCRIPTION

Figure 1:
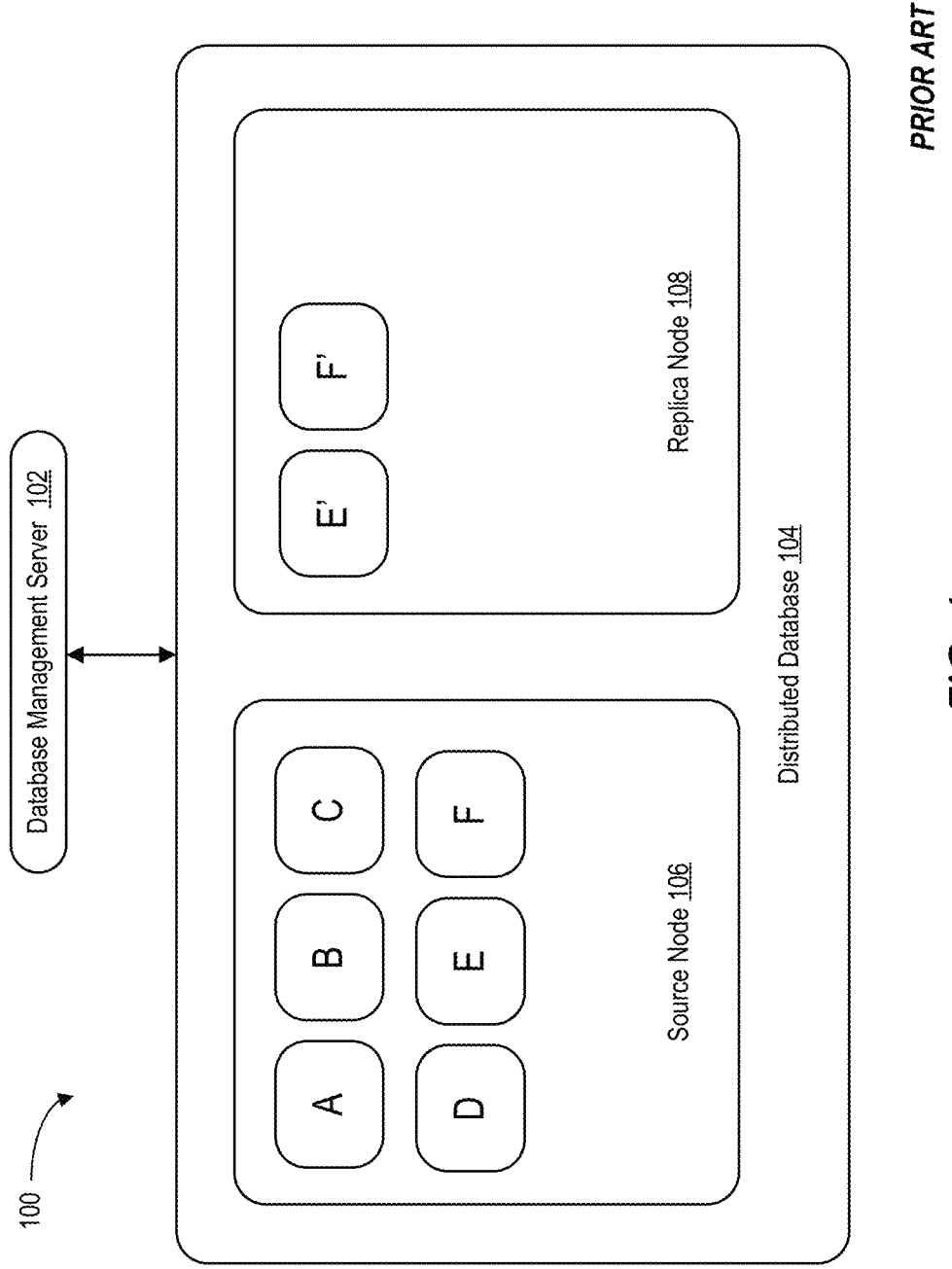
FIG. 1 is a block diagram of a distributed database system with asynchronous table replication.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Provided herein are system, method and/or computer program product embodiments, and/or combinations and sub-combinations thereof, for increasing replication performance where a source table is frequently updated and reducing the visibility gap between source and replica tables. An embodiment operates by receiving replication log entries and transaction commit log entries for database transactions to be replayed to rows at a replica table. The replication log entries are replayed in parallel to the replica table at a replica node based on a comparison of the row-ID column values of the replication log entries to the row-ID column values of the rows at the replica table. The database transactions are committed with transactional consistency to the replica table by serially replaying the transaction commit log entries. Accordingly, because the replication log entries are replayed in parallel, and the database transactions are committed with transactional consistency, the database management system performs faster replication between the source and replica tables which reduces the visibility gap between the source and the replica tables.

A database management system is a collection of computer software programs that control the organization, storage, and retrieval of data in a database. A database is an organized collection of data. A database may be organized according to a database model. A database model determines the logical structure of a database and how data is stored, organized, and manipulated. For example, a relational model is a popular database model.

A relational database model organizes data as a set of tables from which data can be accessed or reassembled in many different ways without having to reorganize the tables. Each table may contain one or more data categories in columns. Each row may contain a unique instance of data for the categories defined by the columns. For example, a business order entry database may include a table that describes a customer with columns for name, address, phone number, and so forth. Each row may have a primary key. A primary key is a column, or combination of columns, designated to uniquely identify a row.

Each table may be represented using either row-based storage or column-based storage. In row-based storage, the database management system stores data row by row in the database. In column-based storage, the database management system stores data column by column in the database.

A database management system that uses column-based storage is often faster than a database management system that uses row-based storage. This is often the case when a database management system performs read intensive operations on a large data repository. This is because a column-oriented database management system only needs to scan the relevant columns when performing an operation. In contrast, a row-oriented database management system must scan the columns of the rows it is reading.

A column-oriented database system is often chosen where operations may be performed on only a few columns. Similarly, a column-oriented database system may be chosen where a table has a large number of columns, or a table has a large number of rows and column operations are typically performed by the database management system.

A request to query, insert, or update a database may be made to a database management system using a database language. A database language is a computer language used to make requests of a database management system. For example, Structured Query Language ("SQL") is a database language used to communicate with a database management system.

A request to query, insert, or update a database may be performed as a database transaction by a database management system. A database transaction consists of one or more independent units of work, each reading or writing data to the database. A database transaction may be read or write. A read database transaction does not write data to the database. For example, a query is a read database transaction. A write database transaction writes data to the database. For example, an insert is a write database transaction.

A database management system executes a database transaction either completely or not at all. If no errors occur during the execution of the database transaction, then the database management system commits the transaction to the database. The database management system commits a database transaction to the database by executing a transaction commit operation. A transaction commit operation causes the database management system to apply all data manipulations within the scope of the database transaction to the database.

If an error occurs during the execution of the database transaction, none of the data manipulations within the scope of the database transaction are applied by the database management system to the database. In no case can a partially complete database transaction be committed by the database management system to the database. In other words, execution of a database transaction by the database management system always leaves the database in a consistent state.

A database management system executes a database transaction in isolation from other database transactions. Furthermore, the database management system checks that the result of executing a database transaction satisfies existing database constraints. In order to track and manage each database transaction, the database management system assigns each database transaction a transaction ID.

FIG. 1 illustrates a distributed database system 100 with table replication, according to an example embodiment. Distributed database system 100 includes a database management system 102 and a distributed database 104.

Database management system 102 is a collection of computer software programs that control the organization, storage, and retrieval of data in distributed database 104. A request to query, insert, or update data in distributed database 104 is performed as a database transaction by database management system 102.

Distributed database 104 is stored in source node 106 and replica node 108. Source node 106 and replica node 108 may be separate computers located in the same physical location. Source node 106 and replica node 108 may also be separate computers dispersed over a network of interconnected computers.

Distributed database 104 is a relational database. For example, distributed database 104 includes tables A, B, C, D, E, and F. The tables of distributed database 104 are stored in source node 106 and replica node 108.

The tables stored in source node 106 are source tables. The source tables in source node 106 contain the current data in distributed database 104. As would be appreciated by a person of ordinary skill in the art, the source tables in source node 106 may be stored across a plurality of source nodes.

Specifically, each source node of a plurality of source nodes may store a subset of the source tables in distributed database 104 and operate exclusively on that particular subset.

The tables stored in replica node 108 are replica tables. A replica table is a copy of a source table in source node 106. As would be appreciated by a person of ordinary skill in the art, the replica tables may be stored across a plurality of replica nodes.

Database management system 102 may designate one or more source tables stored in source node 106 for replication to replica node 108. Database management system 102 then maintains copies of these designated source tables at replica node 108 as replica tables. For example, database management system 102 replicates tables E and F at source node 106 as tables E' and F' at replica node 108. In other words, tables E' and F' are copies of tables E and F. As would be appreciated by a person of ordinary skill in the art, database management system 102 may replicate all, or a proper subset, of the source tables in source node 106 to replica node 108 depending on usage requirements.

By maintaining replica tables at replica node 108, database management system 102 may distribute read database transactions among the source tables at source node 106 and the replica tables at replica node 108. In other words, database management system 102 can perform load balancing by distributing read database transactions to the replica tables. This may increase overall read database transaction performance for database management system 102 of distributed database 104 by reducing Central Processing Unit ("CPU") consumption and table contention at source node 106.

Database management system 102 may submit a read database transaction to either the source tables or replica tables. This is because database management system 102 maintains the state of the source tables in source node 106 with the state of the replica tables in replica node 108.

Database management system 102 must submit a write database transaction to the source tables in source node 106. This is because the source tables in source node 106 contain the current data. Database management system 102 cannot send a write database transaction directly to the replica tables in replica node 108 because the source tables in source node 106 would end up containing outdated data. Specifically, the data in the source tables in source node 106 would become inconsistent with the data in the replica tables in replica node 108.

In order to ensure that the data in the source tables in source node 106 is consistent with the data in the replica tables in replica node 108, database management system 102 replays all write database transactions at the source tables in source node 106 to the corresponding replica tables in replica node 108. This ensures that the data in the replica tables is consistent with the data in the corresponding source tables.

Database management system 102 may replay all write database transactions at the source tables to the corresponding replica tables either synchronously or asynchronously. In synchronous table replication, database management system 102 updates the source table and the corresponding replica table at the same time. In other words, database management system 102 updates the replica table during the same transaction boundary as the source table. This ensures that the replica table will contain the same data as the source table. However, synchronous table replication often increases the write database transaction response time for database management system 102. This is because the replica table is updated by database management system 102 at the same time as the corresponding source table.

In ATR, database management system 102 does not update the source table and the replica table at the same time. Rather, database management system 102 may update the replica table after the write database transaction is committed at the source table. This means the replica table may contain outdated data compared to the source table. However, ATR often incurs significantly less performance overhead for database management system 102 than synchronous table replication.

While database management system 102 often incurs less performance overhead when performing ATR, it often introduces significant delay in table replication. This is because database management system 102 must ensure transactional consistency when replaying write database transactions at the replica table. Specifically, database management system 102 may have to replay write database transactions at the replica table more slowly in order to ensure transactional consistency.

Figure 2:
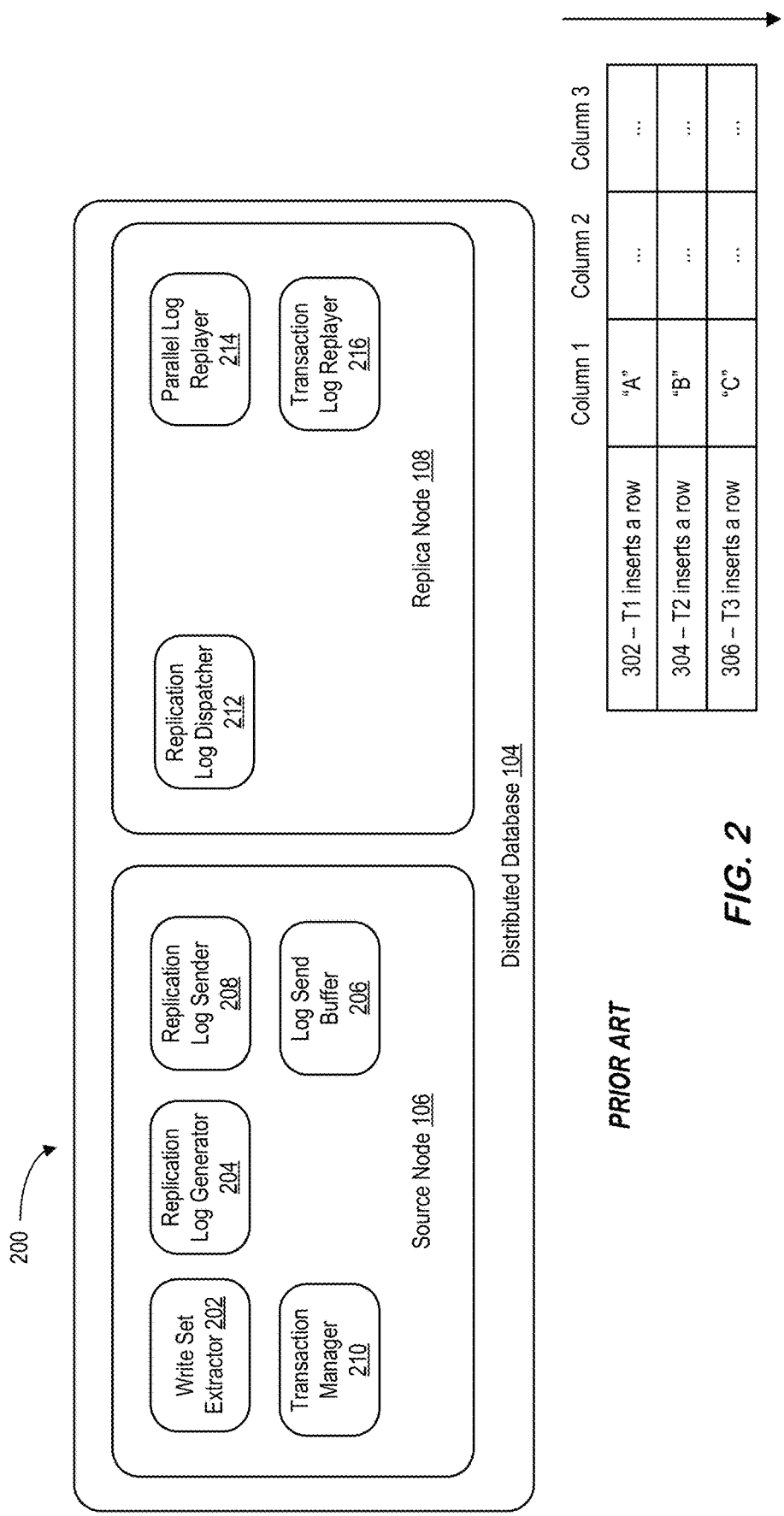
FIG. 2 is a block diagram of a distributed database system with transactional and parallel log replay for asynchronous table replication.

FIG. 2 illustrates a distributed database system with transactional and parallel log replay for ATR, according to an example embodiment. This example embodiment for ATR minimizes table replication delay by replaying write database transactions in parallel while still ensuring transactional consistency. Specifically, the database management system in this example embodiment replays replication log entries in parallel while serializing the replay of transaction commit log entries.

A technical problem with a database management system replaying write database transactions in parallel is ensuring transactional consistency when the transactions update the same row of a replica table in the distributed database. In the example of FIG. 2 for the embodiment of FIG. 2, there are three consecutive write database transactions (e.g. T1, T2, and T3) for the same row at a source table. Transaction T1 is the first transaction and inserts a row at the source table. Transaction T2 is the second transaction and updates the row at the source table. Transaction T3 is the final transaction and also updates the row at the source table.

The database management system must replay these three database write transactions in order at the replica table in order to ensure transactional consistency. For example, if transaction T2 is replayed after transaction T3, the final value of column 1 of the row at the replica table will be "B". However, this would be inconsistent with the value of column 1 of the row at the source table which is "C".

In an example embodiment, a database management system may ensure transactional consistency by replaying database write transactions at the replica node based on table ID. In other words, the database management system may replay a single database write transaction to a replica table at a time. However, if the database management system frequently updates a source table, then the database management system may have to serially replay the database write transactions to the replica table. This may significantly limit the speed by which the database management system may replay database write transactions.

The embodiment in FIG. 2 overcomes this technical problem by creating a row-ID column in the source tables and the replica tables. Specifically, each row in a source table or replica table has a row-ID column. The row-ID column may be of small length. For example, the row-ID column may be 8 bytes in length. However, a person of ordinary skill in the art would appreciate that the row-ID column may be of different length.

In the embodiment in FIG. 2, the database management system increments the value of row-ID column of a row in the source table for a write database transaction to the row. The database management system similarly increments the value of the row-ID column at the corresponding row of the replica table after replaying the write database transaction at the replica table.

The row-ID column value is different than the primary key column value of a row because the value of the row-ID column is incremented when the row is updated. In contrast, the primary key column value is never updated for a row. In other words, the row-ID column value is a change identifier whereas the primary key column value is a row identifier.

In the embodiment in FIG. 2, the database management system may increment the row-ID column value for each write database transaction with minimal performance overhead. This is because of two aspects of the embodiment in FIG. 2.

First, in the embodiment in FIG. 2, the row-ID column value is of small length. Specifically, the row-ID column value may be 8 bytes in length. Because the row-ID column value is of small length, the database management system may increment the row-ID column value using a single atomic hardware instruction. For example, the row-ID column value may be incremented using a compare-and-swap instruction. Because the database management system may perform a single atomic hardware instruction with minimal overhead, the database management system may efficiently increment the row-ID column value.

Second, the database management system may not need to log the incrementing of the row-ID column value because the next row-ID column value can be reset as the maximum value of the available values in the row-ID column. For example, the database management system may reset the row-ID column value as the maximum value of the available values in the row-ID column after a restart of the database management system.

The embodiment in FIG. 2 includes distributed database system 104 from FIG. 1. The tables of distributed database 104 are stored in source node 106 and replica node 108. Source node 106 and replica node 108 are also from FIG. 1.

Source node 106 includes a write set extractor 202, a replication log generator 204, a log send buffer 206, a log sender 208, and a transaction manager 210. Write set extractor 202 extracts the operation type, table ID, transaction ID, the new row image, and row-ID column value for each write database transaction on a row of a source table in source node 106.

The operation type represents the type of write database transaction being performed. For example, the write database transaction could be an insert, update, or delete operation. The table ID is a value that uniquely identifies the table containing the row being updated. The database management system may assign a unique table ID value to each source table.

The transaction ID is a value that uniquely identifies a write database transaction to be performed by the database management system. The transaction ID allows the database management system to ensure the order in which write database transactions are performed. For example, a write database transaction with a transaction ID of 101 must be performed before a write database transaction with a transaction ID of 102 for the same given row. Otherwise the row will contain inaccurate data.

Replication log generator 204 generates a replication log entry for a changed row of a source table. Specifically, the replication log entry may contain the operation type, table ID, transaction ID, the new row image for the changed row as extracted by the write set extractor 202. In addition, the replication log entry may contain one or more row-ID column values.

For an insert operation, a replication log entry contains the new row-ID column value of the inserted row. For an update operation, a replication log entry contains the old row-ID column value of a row before the update operation and the new row-ID column value after the update operation is completed. For a delete operation, a replication log entry contains the old row-ID column value of the row to be deleted before the delete operation is completed. As would be appreciated by a person of ordinary skill in the art, a replication log entry may be represented and stored in various ways.

Replication log generator 204 appends a generated replication log entry to log send buffer 206. Log send buffer 206 stores replication log entries and transaction commit log entries.

Log sender 208 send replication write log entries and transaction commit log entries in log send buffer 206 to replica node 108. For example, where source node 106 and replica node 108 are connected over a computer network, log sender 208 sends replication log entries in log send buffer 206 to replica node 108 over the computer network.

In order to ensure transactional consistency at the source tables of source node 106, transaction manager 210 performs a transaction commit operation to apply a write database transaction to the source tables. In addition, transaction manager 210 creates a transaction commit log entry when the write database transaction is committed by transaction manager 210 to the source tables.

A transaction commit log entry includes the transaction ID of the committed write database transaction. Transaction manager 210 appends a transaction commit log entry to the log send buffer 206. Log sender 206 sends the transaction commit log entry in log send buffer 206 to replica node 108 to apply the committed write database transaction to the replica tables.

At replica node 108, replication log receiver and dispatcher 212 receives replication log entries and transaction commit log entries from source node 106. Replication log receiver and dispatcher 212 dispatches a received log entry to parallel log replayer 214 or transaction log replayer 216 depending on the type of log entry.

If the received log entry is a replication log entry, replication log receiver and dispatcher 212 dispatches the replication log entry to the parallel write log replayer 214. Parallel log replayer 214 may include multiple queues, and each queue may be assigned a replication log entry for replay. Parallel log replayer 214 may replay the replication log entries assigned to each queue simultaneously in parallel. By replaying the replication log entries in parallel, parallel log replayer 214 may minimize the table replication delay between source node 106 and the replica node 108.

Moreover, parallel log replayer 214 may replay two replication log entries for the same replica table in parallel. This is possible because transaction log replayer 216 replays transaction commit log entries serially as discussed below.

If the received log entry is a transaction commit log entry, replication log receiver and dispatcher 212 dispatches the transaction commit log entry to the transaction log replayer 216. This is necessary in ensure transactional consistency during the parallel replay of replication log entries by parallel log replayer 214.

The embodiment of FIG. 2 ensures transactional consistency during the parallel replay of replication log entries by parallel log replayer 214 by enforcing two conditions. First, the result of the replay of a replication log entry may only become visible at a replica table after the corresponding transaction commit log entry is replayed. In other words, the database management system must replay the corresponding transaction commit log entry before the changes made at the source tables are actually persisted at the replica tables. Second, replication log entries may be replayed in parallel independently of their execution order at the source table but transaction commit log entries must be replayed in exactly the same order as they were performed at the source tables.

The embodiment of FIG. 2 ensures these two conditions are satisfied by replaying transaction commit log entries serially at transaction commit replayer 216 and replaying replication log entries in parallel at parallel log replayer 214 based on their row-ID column values. Specifically, parallel log replayer 214 replays a replication log entry for an update or delete operation after its old row-ID column value is visible in the replica table. This ensures that the second one of two conflicting write database transactions to the same row is replayed only after its preceding write database transaction is replayed and committed. This is because the result of the first write database transaction, including the row-ID column value update, becomes visible at the replica table after the first write database transaction is committed. And the first write database transaction is committed when the transaction log replayer replays a transaction commit log entry for the same transaction ID as the first write database transaction. If parallel log replayer 214 replays the replication log entry subject to this condition, the row-ID column value of the row in the replica table is updated with the new row-ID column value included in the replication log entry (in case of an update log entry).

Because the embodiment in FIG. 2 performs row-ID column value based dynamic detection of conflicting write sets, replication log entries can be freely dispatched by replication log receiver and dispatcher 212 to multiple queues at parallel log replayer 214 without restriction. In particular, replication log receiver and dispatcher 212 can dispatch the replication log entries without performing table-level serialization. This may significantly accelerate the replication log replay performance, which also will reduce the visibility gap between the source tables and replica tables under ATR.

Note that database replication used in many enterprise mission-critical database systems for practical purposes such as disaster recovery, high availability, and load balancing. Examples of replication options include.

System Replication: replicating the entire database contents by shipping the recovery redo log to a replica system; mainly used for disaster recovery or high availability.

As previously described, an ATR system may replicate the contents of chosen tables by shipping their Data Manipulation Language ("DML") requests to a replica system; mainly used for load balancing in a multi-node scale-out deployment (i.e., distributing those chosen tables' workloads to multiple nodes to exploit more computation resource when processing the workloads).

Trigger-based Table Replication: replicating the contents of chosen tables by shipping changed rows extracted by a Structured Query Language ("SQL") Trigger; mainly used for load balancing, like ATR. Among them, ATR may be a better option when the system wants to replicate a table or a sub-table (sub-table partitions or columns) for load balancing purpose and also when a system wants to achieve shorter propagation delay and lower overhead to the source system. ATR was initially designed as a replication option among the database nodes belonging to the same scale-out system instance.

However, as the business demand of real-time table replication across multiple independent landscapes (e.g., system instances) increases, the design and implementation of ATR may be significantly expanded by embodiments described herein. This newly extended version of ATR may be referred to as Real-Time (or Remote) Table Replication ("RTR"). With such an extension, RTR may serve a wider spectrum of database replication applications including the following two example situations.

Figure 3:
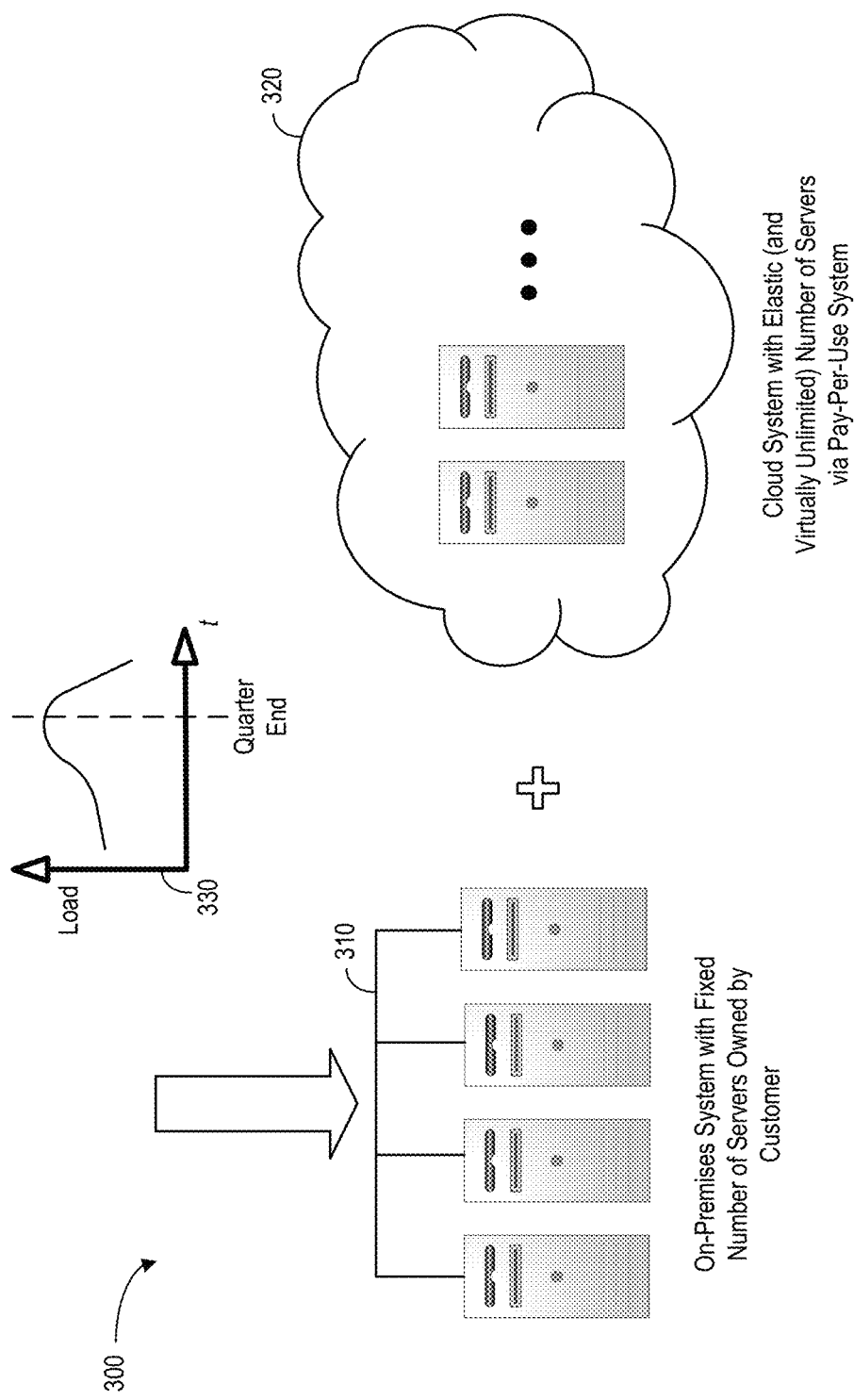
FIG. 3 is a real-time table replication usage example of elastic scaling with a hybrid cloud according to some embodiments.

In a first example situation, when a system has to deal with a dynamically varying workload amount, it is ideal to elastically scale system capacity. Without pre-purchasing hardware assuming worst-case potential peak workload, needed processing capacity can instead be added on demand, dynamically (exploiting hardware resources available via the cloud). For example, FIG. 3 is a system 300 that uses RTR with elastic scaling having both on-premises servers 310 and cloud resources 320 according to some embodiments. As shown by graph 330, when load increases beyond a pre-determined amount (e.g., at end-of-year or end-of-quarter), extra resources from the cloud 320 may be allocated to supplement the on-premises servers 310.

While this architecture may be possible with ATR in theory, RTR may have advantages in that (1) it doesn't require the same transactional domain between the source system and the replica system and (2) the replica system doesn't need to be the same version of database software as the source system. As a result, a replica system can be patched or upgraded with a different life cycle as compared to the source system, which brings more flexibility to the overall system architecture. For example, while the traditional Enterprise Resource Planning ("ERP") workloads might be served at the on-premise version of database software (the source system), the new types of advanced analytics workloads can be served at the newer (and/or more frequently-upgraded) cloud version of the database software (the replica system).

Figure 4:
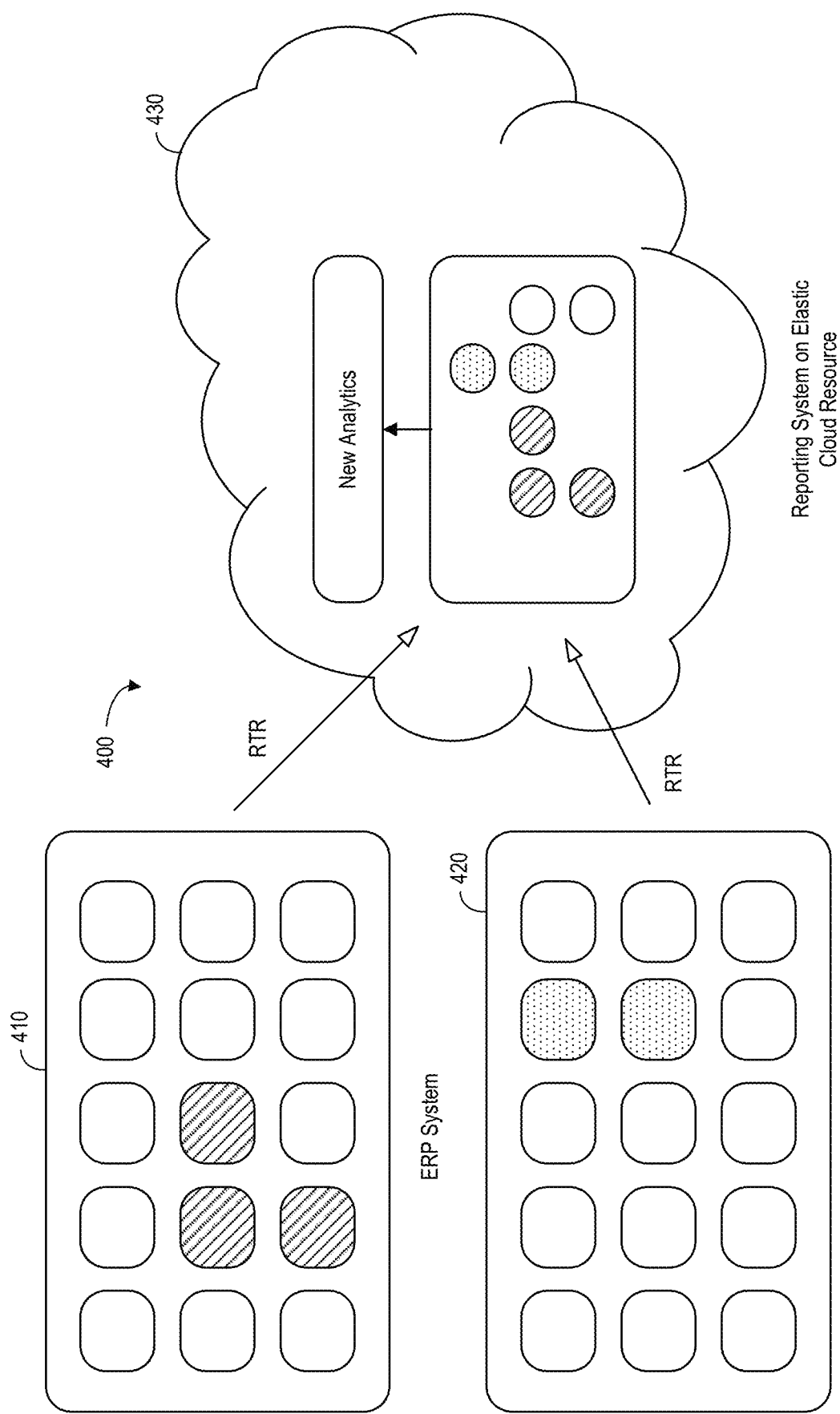
FIG. 4 is a real-time table replication usage example of efficient data virtualization from multiple remote systems in accordance with some embodiments.

In a second example situation, data scattered from multiple remote systems may be more efficiently queried with RTR as compared to ATR. For example, when a new analytics query requires both database tables from an ERP system and other database tables from a Customer Relationship Management ("CRM") system, the two sources can be separately queried and merged in an ad-hoc way in the application layer. For example, FIG. 4 is an RTR system 400 that uses efficient data virtualization from multiple remote systems (ERP 410 and CRM 420) in accordance with some embodiments. The new analytics in a cloud environment 430 can then use RTR to collect the needed information from both of the remote systems 410, 420. By using RTR for the multiple remote source systems 410, 420, the query can be efficiently processed without involving network hops on every execution and also more transparently by natively processing the query at the database layer. This RTR-based real-time data virtualization may, according to some embodiments, be a feature of a cloud computing environment.

In order to enable such a real-time cross-system replication, RTR may need to deal with the following additional aspects as compared to ATR:

separate transaction domains between the source system and the replica system;

separate metadata domains between the source system and the replica system;

potentially different software binary versions between the source system and the replica system; and geo-graphical distance between the source system and the replica system.

According to some embodiments, key architectural features of RTR may include:

row-level parallel replay with ensuring strict transactional consistency;

Data Definition Language ("DDL") replication and reconstructing a DDL statement at a replica system from one or multiple metadata update log entries;

table-level parallel DDL replication with ensuring strict transactional consistency;

support of multiple replication object granularities: a set of tables, a table, a sub-table (one or more columns, one or more partitions);

support of various replication topologies, including replication from multiple distinct remote source systems ("N-to-1 replication"), replication to multiple distinct remote replica systems ("1-to-N replication"), and chain replication with a first replica table being a source of a second replica table;

in-memory log replication without relying on typical store-and-forward mechanism;

push-based and early log shipping to reduce propagation delay between source and replica systems.

Figure 5:
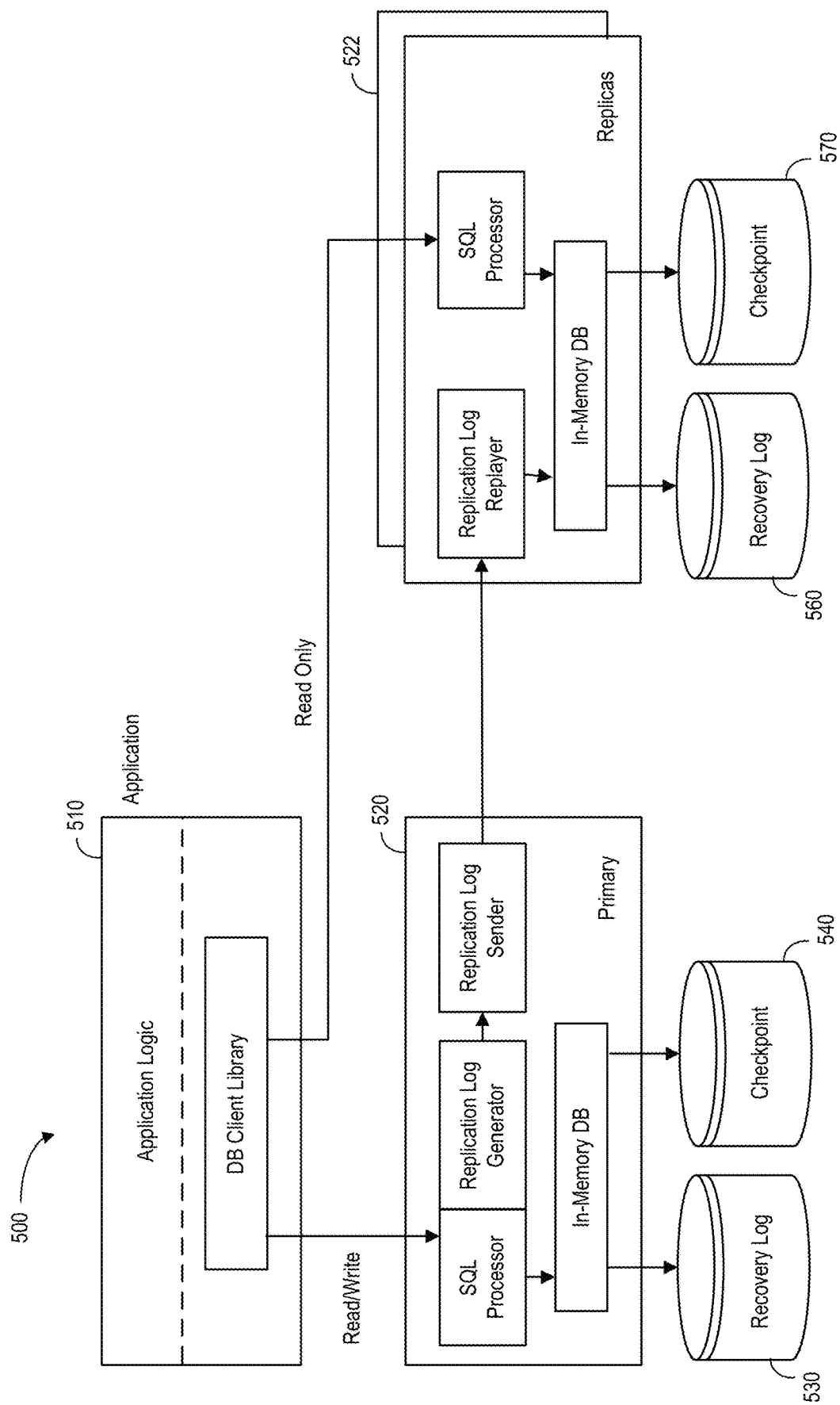
FIG. 5 is an overall real-time table replication architecture according to some embodiments.

FIG. 5 is an overall real-time table replication architecture 500 according to some embodiments. The system consists of a primary 520 (and associated recovery log 530 and checkpoint 540) and one or more replica servers 522 (and associated recovery log 550 and checkpoint 560), each of which can be connected with another by a commodity network interconnect without any shared storage necessarily. All write requests are automatically directed to the primary server 520 by the database client library, embedded in the application process 510. During the course of processing a received write request, the primary server 520 generates a replication log entry of the write request makes any change to a replication-enabled table. Note that RTR can be applied to only a selected list of tables, not necessarily replicating the entire database. The generated replication log entry is shipped to the replicas 522 via the network interconnect and then replayed at the replicas 522. By replaying the propagated replication log entries, the in-memory database copies of the replicas 522 are maintained in a queriable and transactionally-consistent state. The database client library transparently routes read-only queries to the replicas if the replica database state meets the given freshness requirements of the queries.

Although RTR can also be extended for high availability or disaster recovery purposes, one purpose of RTR is to offload On-Line Analytical Processing ("OLAP")-style analytical workloads from the primary server 520 which is reserved for handling On-Line Transaction Processing ("OLTP")-style transactional workloads. Additionally, by having multiple replicas 522 for the same primary table 520, RTR can elastically scale out the affordable volume of the OLAP-style analytical workloads. Moreover, by configuring the primary table 520 as an OLTP favored in-memory row store while configuring its replicas 522 as OLAP-favored in-memory column stores in a data platform (such as HANA® available from SAP), RTR may maximize the capability of processing mixed OLTP and OLAP workloads under the common database schema and under the single transaction domain.

Figure 6A:
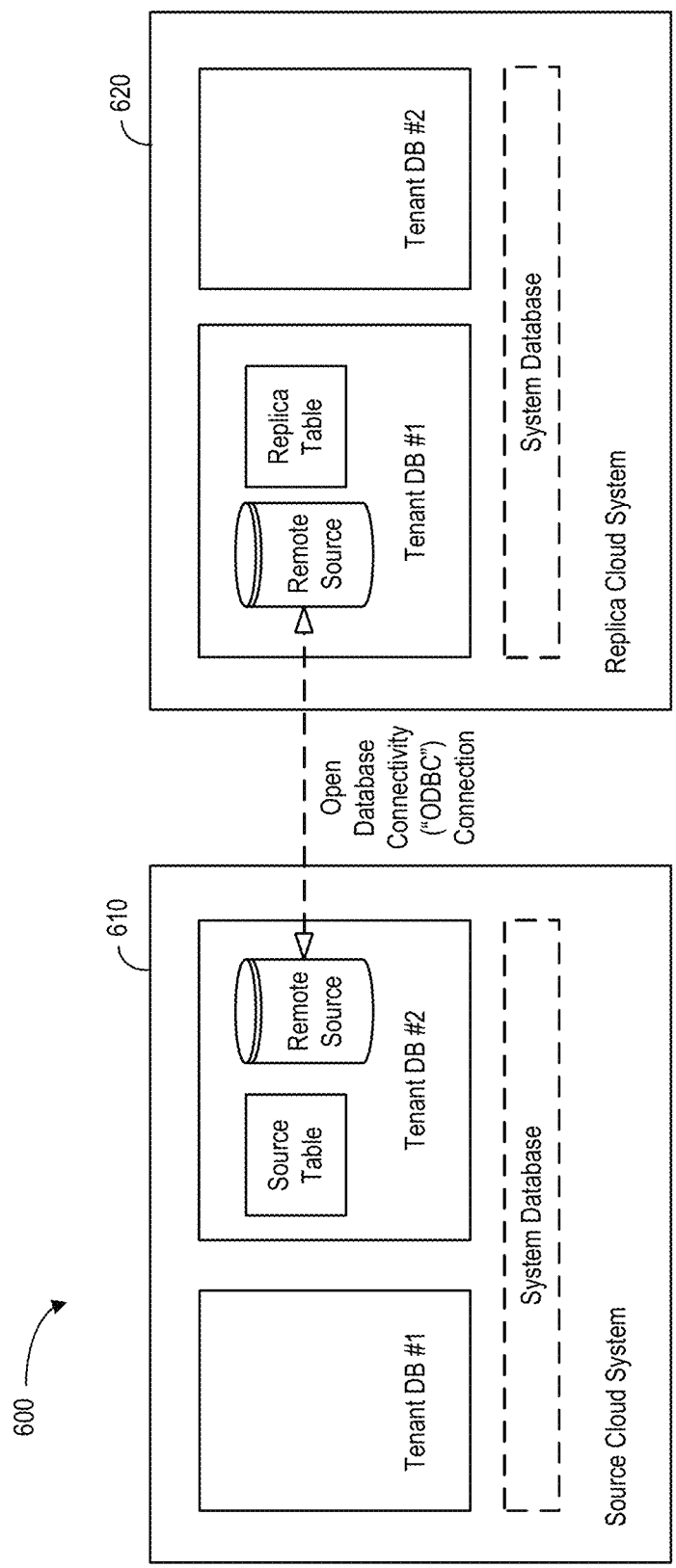
FIG. 6A illustrates cross landscape real-time table replication in accordance with some embodiments.

FIG. 6A illustrates 600 cross landscape RTR in accordance with some embodiments. In particular, a source cloud system 610 having two tenant databases communicates with a replica cloud system 620 having two tenant databases using an Open Database Connectivity ("ODBC") connection. While ATR replicates tables within the same landscape, RTR replicates tables between two different data platform systems. Note that there is already a similar replication approach called SAP® Landscape Transformation ("SLT"). However, SLT is a trigger-based replication causing substantial overhead for the source system. RTR uses an ATR-like log sending approach to provide better performance and lighter overheads. Update logs from the source system 610 may be transferred to the replica system 620 by direct ODBC connection (instead of using TrexNet protocol) for security reasons.

The system 600 stores replication information into system tables. This information is also stored within an in-memory structure (so there is no direct access to the system table in normal conditions). Access to system tables only occurs at server startup time to load the data into in-memory structure and a DDL log replay. During DML log replay, only the in-memory structure is used. Initialization parameters might be associated with indexserver.ini which includes: "metadata" (with a default value=false and set as true for both source and replica system before replication); "metadata" and "crossdb_atr_ddl_test_mode" (with a default value=false for python and unit tests); etc.

System tables may persistently save replication information about remote table replication. There may be five system tables, one for the source system and the others for the target system:

SYS.REMOTE_TABLE_REPLICA_SOURCES_(replication relationship information saved at source system);

SYS.REMOTE_TABLE_REPLICA_TARGETS_(replication relationship information saved at target system);

SYS.REMOTE_TABLE_REPLICA_COLUMNS_(column information of source table saved at target system);

SYS.REMOTE_TABLE_REPLICA_INDEXES_(index information of source table saved at target system;

and SYS.REMOTE_TABLE_REPLICA_PARTITIONS_ (partition spec information of source table saved at target system.

A REMOTE_TABLE_REPLICA_SOURCES_table may store RTR information as a source system. This shows which tables of this system are replicated to which replica system(s). With the content of this table, in-memory RTR information is recovered when the server restarts. A REMOTE_TABLE_REPLICA_TARGETS_table may store RTR information as a replica system. This shows which tables of this system are replica of which tables of source system. With the content of this table, in-memory RTR information is recovered when server restart. A REMOTE_TABLE_REPLICA_COLUMNS_table may store RTR information as a target system. This information is used during DDL replay. With the content of this table and metadata redo logs received from source system, RTR DDL replayer generates DDL statement for replica table which are related to columns, like ADD, ALTER, or DROP COLUMN.

A REMOTE_TABLE_REPLICA_INDEXES_table may store RTR information as a target system. This information is used during DDL replay. With the content of this table and metadata redo logs received from source system, RTR DDL replayer generates DDL statement for replica table which are related to indexes and constraints like ADD or DROP CONSTRAINT and CREATE or DROP INDEX.

A REMOTE_TABLE_REPLICA_PARTITIONS_table may store RTR information as a target system. This information is used during DDL replay. With the content of this table and metadata redo logs received from source system, RTR DDL replayer generates DDL statement for replica table which are related to table partition like PARTITION BY, ADD PARTITION FROM OTHERS, DROP PARTITION, etc.

According to some embodiments, built-in procedures may be associated with RTR creation, activation, and deactivation (triggered at replica system by DDL statements). During execution of RTR related DDL statements at replica system, it calls relevant built-in procedures which are executed at source system via remote source. For example, during execution of 'CREATE REPLICA' DDL in replica system, a 'SYS.REMOTE_TABLE_REPLICA_CREATE_DEV' procedure may be executed at a source system for RTR initialization at source side. 'SYS.REMOTE_TABLE_REPLICA_ENABLE_DEV' may be executed at source side for 'ENABLE REPLICA' DDL of replica side, and 'SYS.REMOTE_TABLE_REPLICA_DISABLE_DEV' for 'DISABLE REPLICA' DDL. 'SYS.REMOTE_TABLE_REPLICA_LOG_TRANSFER_DEV' is for sending ATR logs from source system to replica system, so this is called at source side and executed at replica side.

According to some embodiments, in-memory structures may be associated with RTR information stored persistently in system tables (and relevant information may also be managed in-memory). This in-memory information may be managed under MDR::ReplicationInfo and is accessed by RTR ReplicationManager. This information may also restored from system tables when indexserver is restarted with MDR::ReplicationInfoHelper class. In the source system, when there are changes (DML or DDL) on a table, ReplicationManager checks if this table is RTR replicated or not. If it is, ReplicationManager gets replica locations to send ATR logs. Also, relevant remote source name and target remote source name are acquired for sending logs. With source table oid, the following information may be acquired by ReplicationManager: Replica location(s): to get replica location(s); remote source name: to send ATR logs via remote source; and (Target) remote source name. Because RTR logs are sent via remote source (not TrexNet protocol), ReplicationManager may need to get remote source name from replica location acquired from m_logsender_map. A hash table may be used to get remote source name from replica location (and this hash table may also be used in replica side). In a replica system, received ATR logs includes source table oid and target remote source name. To replay the ATR logs, ATR log replayer needs to find the target table for ATR log replay.

With respect to RTR setup, activation, and/or deactivation, some embodiments may provide for a preparation of remote sources. FIGS. 6B through 6H are methods associated with RTR setup, activation, and deactivation. Before replicating a table by RTR, remote sources should may be created at both source system and replica system to each other. A source system may have a Smart Data Access ("SDA") remote source to replica system and a replica system must have a SDA remote source to source system. These remote sources may be used for ATR log transfer and replication activation/deactivation.

RTR replication may be initiated at replica side by executing the following DDL statement:

CsREATE TABLE <schema_name>.<table_name> LIKE <remote_source_name_at_target>.<remote_schema_name>.<remote_table_name> ASYNCHRONOUS REPLICA USING REMOTE SOURCE <remote_source_name_at_source>

Figure 6B:
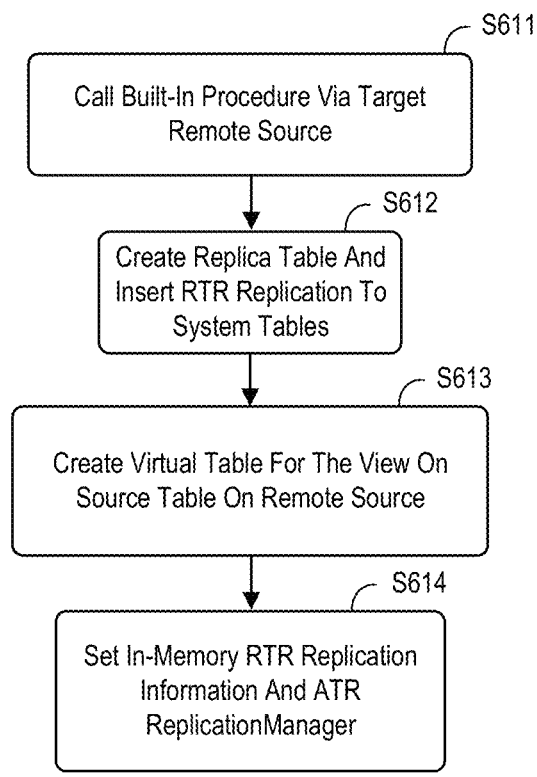
FIGS. 6B through 6H are associated with RTR setup, activation, and deactivation.

FIG. 6B is an RTR table creation DDL method according to some embodiments. Steps inside RTR table creation DDL (void QueryExecutor::create_remote_table_replica( )) may include S611 to call SYS.REMOTE_TABLE_REPLICA_CREATE_DEV( ) via target remote source (remote_source_name_at_target), so this built-in procedure is executed at source system. Inside this built-in procedure, the following internal steps may be executed at the source system:

Get metadata of source table (as json format) and table group information.

Create a view on this source table. The name of this view might be _SYS_REMOTE_REPLICA_SOURCE_{source_table_oid}. This view is for table data synchronization during RTR activation phase. Because this data synchronization is executed by 'insert' and 'delete' SQL statement based on "$rowid$" comparison between source table and replica table, this view includes all columns of source table plus rowid column. Because "$rowid$" syntax cannot be used on virtual table on remote source by replica side, virtual table on replica side cannot be created on the source table directly. Therefore, this view has a column named as "_ROWID_FOR_REP" which selects "$rowid$" column of source table, and the virtual table on replica side is created on this view, not the source table directly.

Insert RTR information to system table(SYS.REMOTE_TABLE_REPLICA_SOURCES) and in-memory.

Register RTR information to ReplicationManager (not activate yet, just register).

Invalidate AsyncPlan of this source table so this newly registered replication can be recognized by DML on source table.

At S612, the system may create a replica table and insert RTR replication to system tables. With the metadata acquired by built-in procedure above, relevant DDL statement are generated and executed, so the empty replica table is created (based on import-export component APIs). The system may also insert RTR information to system tables. In replica system, not only SYS.REMOTE_TABLE_REPLICA_TARGETS_, SYS.REMOTE_TABLE_REPLICA_COLUMNS_, SYS.REMOTE_TABLE_REPLICA_INDEXES_and SYS.REMOTE_TABLE_REPLICA_PARTITIONS_tables are filled. These system tables are needed for DDL replay later.

At S613, the system may create virtual table for the view on source table on remote source. A virtual table may be created on the view which is created by built-in procedure at source system. Note that "$rowid$" syntax may not be allowed on virtual table, so the system may create a virtual table on the view which has rowid column (as name of _ROWID_FOR_REP) and all other columns of source table. At S614, the system may set in-memory RTR replication information and ATR ReplicationManager.

Figure 6C:
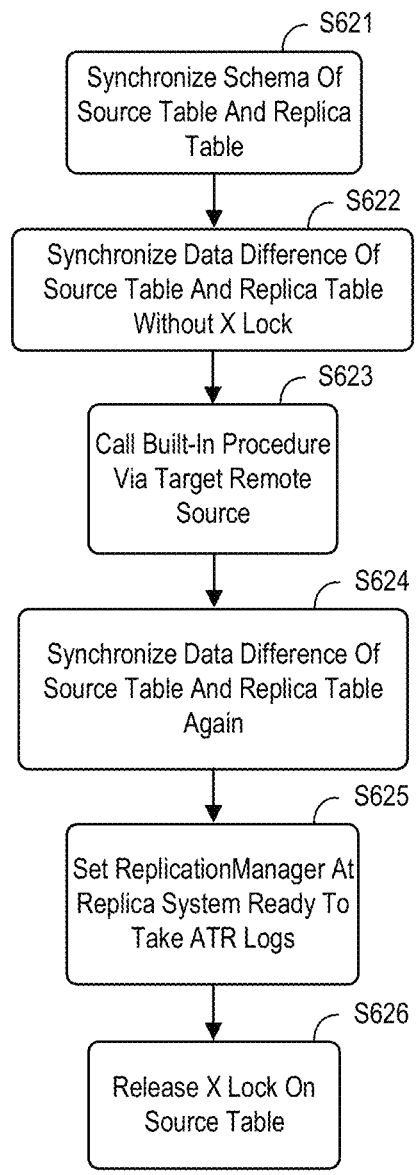

FIG. 6C is an RTR replication activation method according to some embodiments. Note that RTR activation may be triggered by the following DDL statement at the replica side:

ALTER TABLE <schema_name>.<table_name> ENABLE ASYNCHRONOUS REPLICA

Activating RTR replica might be executed after some time of RTR de-activated period. In RTR de-activated period, the replication is disconnected so not only DML but also DDL can be done to source table only. So, before reactivating ATR log transfer, DML and DDL difference should be synchronized first.

Steps inside RTR activation DDL (void QueryExecutor:: alter_table_enable_remote_table_replica( )) may include S621 to synchronize the schema of source table and replica table. Note that metadata of source table (by calling SYS.REMOTE_TABLE_REPLICA_CREATE_DEV with special option) is acquired and compared to metadata of replica table. If there are metadata difference detected, DDL statements are generated and executed to replica table so the table schema is synchronized first At S622 the system may synchronize data difference of source table and replica table without X lock. According to some embodiments, data synchronization is done by executing 2 SQL statements:
(1) Delete rows from replica table which does not exist in source table anymore by comparing "$rowid$" of rows; and
(2) Insert rows into replica table which only exist in source table but not replica table by comparing "$rowid$" of rows.

If the time of RTR inactivated period was long, this data difference can be a lot. Not to hold the X lock on source table a long time, the system may synchronize the data without X lock first. If there are changes on columns of source and replica tables, error can occur while executing above SQLs because these SQL statements are on virtual table (to relevant view on source system). Then view at source system and relevant virtual table at replica system are dropped and recreated, and data synchronization is retried.

At S623 the system may call SYS.REMOTE_TABLE_REPLICA_ENABLE_DEV( ) via target remote source, so this built-in procedure is executed at source system. Inside this built-in procedure, following internal steps are executed at source system. Note that the X lock on source table may be to block any DML/DDL on source table while second data sync is on process. The system may also set ReplicationManager on source system to send ATR logs to replica system. At S624, the system may synchronize data difference of source table and replica table again. Because X lock on source table is being hold at source system, there cannot be any DML/DDL on source table. So, after this second data sync, source and replica table has completely same data. By first data sync at S622, there should not be a lot of data differences, so DELETE/INSERT SQL executions are expected not to take long this time. At S625, the system may set ReplicationManager at replica system ready to take ATR logs. At S626, the system may release X lock on source table. By committing this DDL transaction, X lock acquired at step 3 will be released and DML/DDL on source table are unblocked.

Figure 6D:
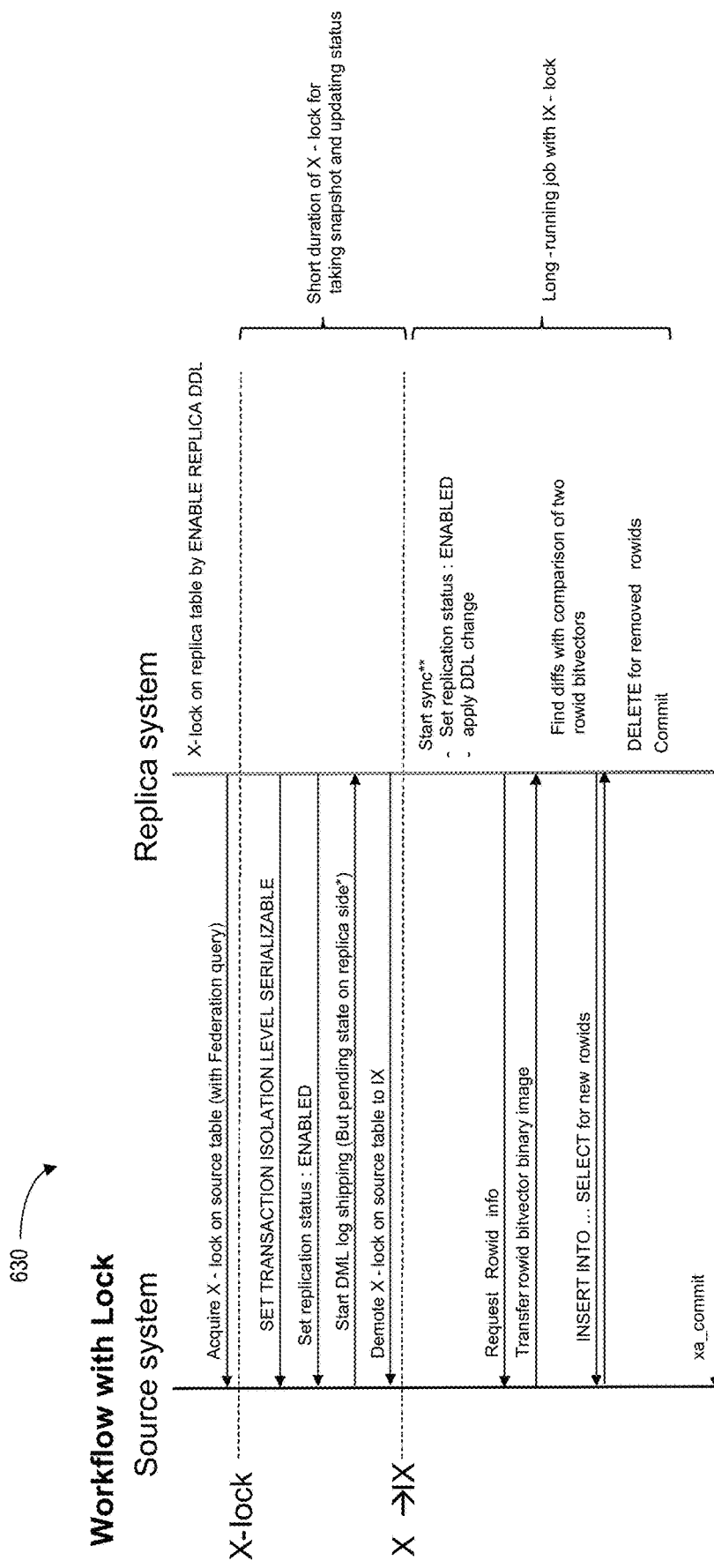

Some embodiments may optimize activation logic to avoid a second diff synchronization and minimize the X-lock duration. For example, FIG. 6D is a workflow 630 that may enable RTR replication with a short X-lock on a source table in accordance with some embodiments. In particular, the workflow 630 uses the short duration x-lock to take a snapshot and update status. According to some embodiments, a long running job is then performed with IX-lock. Note that shipped DML logs should not be discarded in ENABLING status, and a log dispatcher should block incoming DML logs. With respect to the initial synchronization, the system may apply the DDL change on the replica table after the lock is demoted to IX. Moreover, JSON may be obtained from the source and the replica may be updated. In addition, the DDL should not be executed on the source (blocked by IX-lock acquired and online DDLs should be blocked on source table). According to some embodiments, the Log Dispatcher needs to block dispatching DML logs. After demoting a lock to IX-mode, the DML logs may then be shipped to the replica. At DML log replay, the Log Dispatcher may build a prepared statement with ReplicaTableInfo (generated by replica table metadata). According to some embodiments, the system may need to wait for ENABLE REPLICA commit, because it should see the latest table metadata (updated by applyDDLChange) and may then clean up the ReplicaTableInfo cache. In addition, the Log Dispatcher may block dispatching until ENABLE REPLICA DDL is committed. Note that ENABLED status might be rollbacked if ENABLE REPLICA DDL fails (e.g., handle with try/catch). Moreover, status ENABLING may be related to statement routing in ATR case (that is, RTR might not need this status).

Figure 6E:
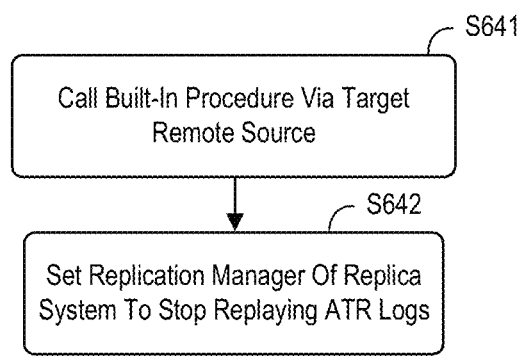

FIG. 6E is an RTR table deactivation method according to some embodiments. According to some embodiments, RTR deactivation may be triggered by DDL statement below at replica side:
ALTER TABLE <schema_name>.<table_name> DISABLE ASYNCHRONOUS REPLICA Steps inside RTR deactivation DDL (QueryExecutor:: alter_table_disable_remote_table_replica( )) may include S641 to call SYS.REMOTE_TABLE_REPLICA_DISABLE_DEV( ) via target remote source, so this built-in procedure is executed at source side. Inside this procedure, following internal steps are executed at source side. The system may set ReplicationManager of source system to stop sending ATR logs to replica. If this procedure is called for DISABLE REPLICA, it returns here. When this procedure is called for DROP TABLE, additional jobs may be performed—this will be described in connection with "Drop replica table." At S642, the system may set ReplicationManager of replica system to stop replaying ATR logs.

Figure 6F:
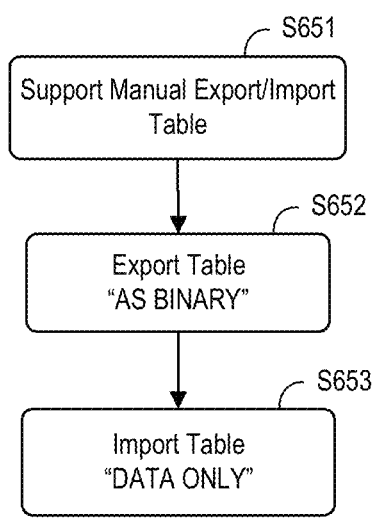

FIG. 6F is an RTR table data export/import method according to some embodiments. Between "CREATE replica" and "ENABLE replica," a manual export/import table is supported. at S651. If the content of source table is substantially large, data synchronization by 'insert into . . . select . . . ' statement might take a long time. So, for this case, exporting source table and importing into replica table would do the efficient and much faster initial data synchronization. Exporting a table should be done with an "AS BINARY" option (at S652), and importing a table should be done with a "DATA ONLY" option (at S653). Steps may include the following
In replica system, create replica table first:
CREATE COLUMN TABLE . . . LIKE . . . ASYNCHRONOUS REPLICA USING REMOTE SOURCE . . .
In source system:
EXPORT schema.table AS BINARY INTO . . .
(After copying exported files to replica system)
In replica system:
IMPORT schema.table AS BINARY FROM . . . WITH DATA ONLY
In replica system, now "enable replica":
ALTER TABLE schema.table ENABLE REPLICA
Some embodiments may also support an automatic table export and/or import, if available. That is, in some embodiments ENABLE REPLICA may include the steps for binary export, transfer, and/or import.

Figure 6G:
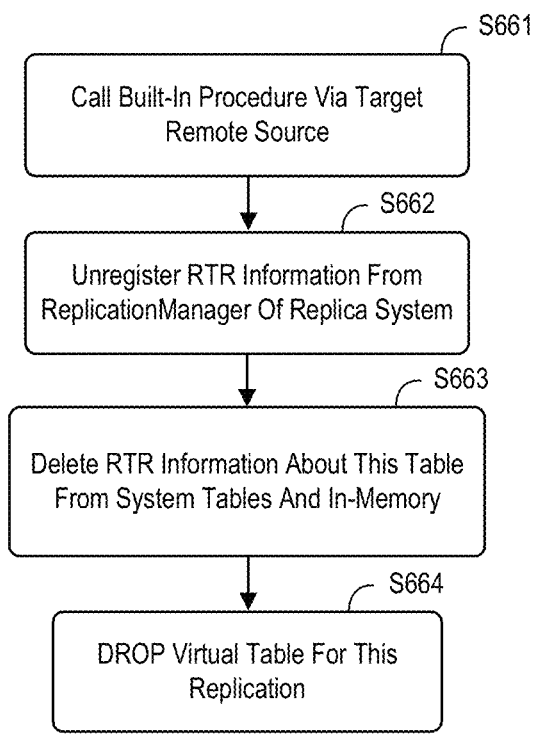

FIG. 6G is an RTR replica table drop method according to some embodiments. Note that RTR information for both source and replica system is cleared when replica table is dropped: DROP TABLE <schema_name>.<table_name>.

(QueryExecutor::alter_table_disable_remote_table_replica( )) when DISABLE REPLICA DDL is called is again used for DROP TABLE too. But for this case, the argument 'calledAtDropTable' is true, so it does one more job—cleaning up RTR information on both replica and source system. Steps may include S661 to call SYS.REMOTE_TABLE_REPLICA_DISABLE_DEV( ) via target remote source, so this built-in procedure is executed at source side. Note that argument 'calledForDropTarget' of this procedure may be set to "True." Inside this procedure, following internal steps are executed at source side:

Unregister RTR information from ReplicationManager of source system.
Delete RTR information from system table (SYS.REMOTE_TABLE_REPLICA_SOURCES_) and from in-memory, too.
Invalidate ATR AyncPlan
If this replication is the last one for this table so there's no more replica anymore, DROP VIEW (SYS_REMOTE_REPLICA_SOURCE_{source_table_oid}.

If the source system is not available when the replica table is dropped, RTR information in source system cannot be cleared and left as garbage data. Because RTR strategically doesn't disallow table drop when other side is unavailable, this garbage RTR information in source system can be created, but also can be cleared later by a workaround.

At S662, the system may unregister RTR information from ReplicationManager of replica system. At S663, the system may delete RTR information about this table from system tables and in-memory. Finally, at S664, the system may DROP virtual table for this replication.

Figure 6H:
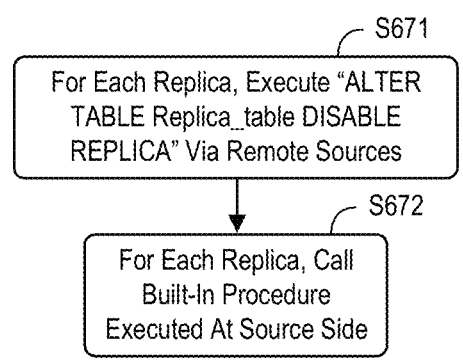

FIG. 6H is an RTR source table drop method according to some embodiments. Note that RTR information for both source and replica system(s) is cleared when source table is dropped:

DROP TABLE <schema_name>.<table_name>

When the source table is dropped, not only RTR information of source system but also RTR information of all replicas are cleaned up. Steps inside (QueryExecutor::drop_table_disable_remote_table_replicated( )) may include, for each replica, execute 'ALTER TABLE replica_table DISABLE REPLICA' via remote sources at S671 so this DDL is executed at every replica side. For every replica, RTR is deactivated (e.g., the replica table is not dropped). If some of replica system is not available when the source table is dropped, RTR information in replica system cannot be cleared and left as garbage data. Because RTR strategically doesn't disallow table drop when other side is unavailable, this garbage RTR information in replica system can be created if source table is dropped first.

For each replica, at S672 call SYS.REMOTE_TABLE_REPLICA_DISABLE_DEV( ) so this procedure is executed at source side. If 'DISABLE REPLICA' DDL above was successfully executed, this procedure might be executed then already, so procedure call this time might do nothing. But in case that the replica system is not available so the 'DISABLE REPLICA' DDL above was not executed, this procedure call can clear RTR information at source side at least.

Some embodiments may additionally support an RTR with a Smart Data Integration ("SDI") syntax. Note that RTR originated from ATR which was for real-time direct/push replication while SDI is instead a subscription model. Even though the system may keep different internal mechanisms (RTR and SDI), some embodiments may consolidate the SQL interface between the two in order to provide a single end-user abstraction. Because the RTR interface will be switched to the SDI-style SQL interface, the user may use RTR with the same interface. RTR may follow the interface except for the adapter name. A user can create, activate, deactivate, and/or drop a remote table replication by executing {CREATE|ALTER|DROP} REMOTE SUBSCRIPTION statements at a replica system. To set up remote table replication, a user may create a virtual table, a target table, a remote subscription, and activate replication on the replica system.

If an exception occurs, it may be processed by executing a PROCESS REMOTE SUBSCRIPTION EXCEPTION statement at a replica system. When an adapter type of a remote source from a virtual table is hanaodbc, the CREATE REMOTE SUBSCRIPTION statement makes a remote table replication

```
CREATE REMOTE SUBSCRIPTION
[<schema_name>.]<subscription_name>
{
    {ON [<schema_name>.]<virtual_table_name> } |
    {AS (<subquery>){
}
    [ WITH SCHEMA CHANGES ]
    { TARGET TABLE <table_spec> <load_behavior> } |
    { TARGET TASK <task_spec> } |
    { PROCEDURE <proc_spec> }
```

CREATE REMOTE SUBSCRIPTION for RTR may be supported when the following conditions are met: (1) the source object type is a virtual table using the ON clause and (2) the target object type is a table. If these conditions are not met, the system may throw a feature not supported error.

```
CREATE REMOTE SUBSCRIPTION
    [<schema_name>.]<subscription_name>
    ON [<schema_name>.]<virtual_table_name>
    TARGET TABLE [<schema_name>].<table_name>;
```

Note that with remote table replication, a WITH SCHEMA CHANGES option may always be true (because RTR cannot be activated without schema synchronization).

An Activate Replication may activate a replication. It first disables the replication and then synchronizes schema and records with a source table. After all the synchronization is complete, it enables the replication. A Deactivate Replication may stop table replication at both source and replica system. A replication status will be marked as 'DISABLED BY USER' in the view M_REMOTE_TABLE_REPLICAS. A Drop Replication may drop replica information and change it to a normal table. A PROCESS REMOTE SUBSCRIPTION EXCEPTION statement may let the user indicate how an exception should be processed.

Figure 7:
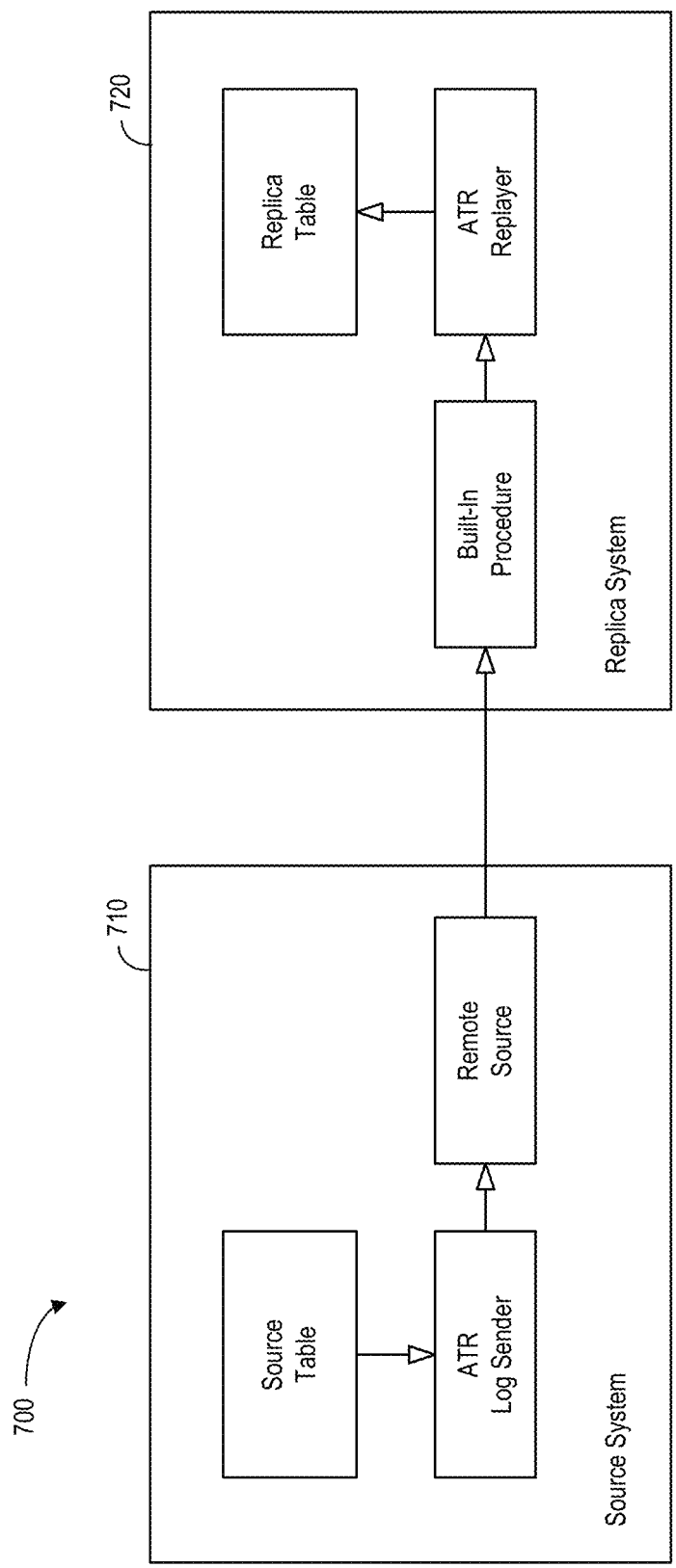
FIG. 7 illustrates an architecture including a source system and a replica system according to some embodiments.

FIG. 7 illustrates an architecture 700 including a source system 710 and a replica system 720 associated with RTR log replay according to some embodiments. Note that DML/DDL changes on RTR source table are transferred to replica system by ATR log sender by calling built-in procedure (SYS.REMOTE_TABLE_REPLICA_LOG_TRANSFER_DEV( )) via remote source. At the replica system 720, transferred logs are handled by ATR replayer so the changes are applied to replica table.

Figure 8:
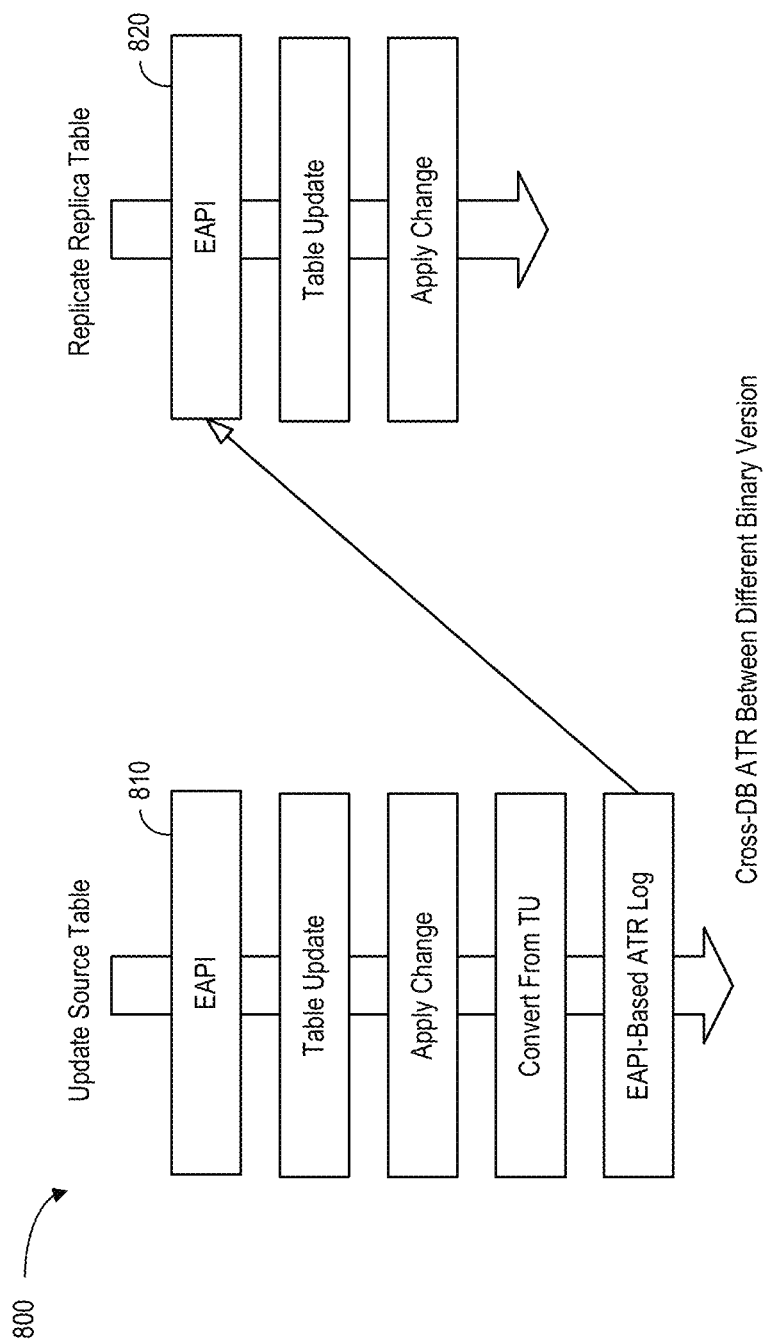
FIG. 8 is a cross-database asynchronous table replication between different binary versions.

For DML changes, ATR added an Extended Application Program Interface ("EAPI") layer inside log transfer and log replay. FIG. 8 is a cross-database ATR 800 between different binary versions according to some embodiments. For the update source table 810, an EAPI layer is followed by a table update, apply change, convert from TU and an EAPI-based ATR log. For the replicate replica table 820, the EAPI layer is followed by a table update and apply change. For DDL changes, ATR just sends raw MDRedoData generated on source system.

Figure 9:
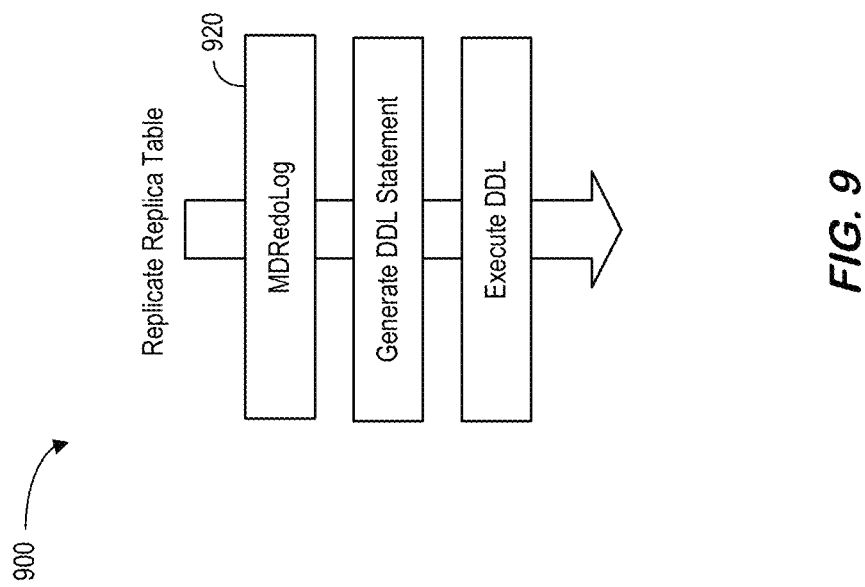
FIG. 9 illustrates how to replicate a replica table in accordance with some embodiments.

In replica system, because these MDRedoData cannot be applied to replica table directly, they are parsed and converted to DDL statement and executed on replica table as shown in FIG. 9, which illustrates 900 how to replicate a replica table in accordance with some embodiments. In particular, MDRedoLog is followed by generate DDL statement and execute DDL.

Note that each MDRedoData may include a JavaScript Object Notation ("JSON") string which describes the metadata change. With this JSON string, the system may reversely generate a DDL statement. A single DDL statement can make multiple metadata redo logs at source system, and to convert right DDL on replica system, all relevant metadata redo logs should be collected. So, in ATR log handler in replica system, received DDL logs are firstly queued in each table's DDL log queues until transaction commit log is detected. When its transaction commit log is transferred, queued DDL logs are converted to DDL statements.

Figure 10:
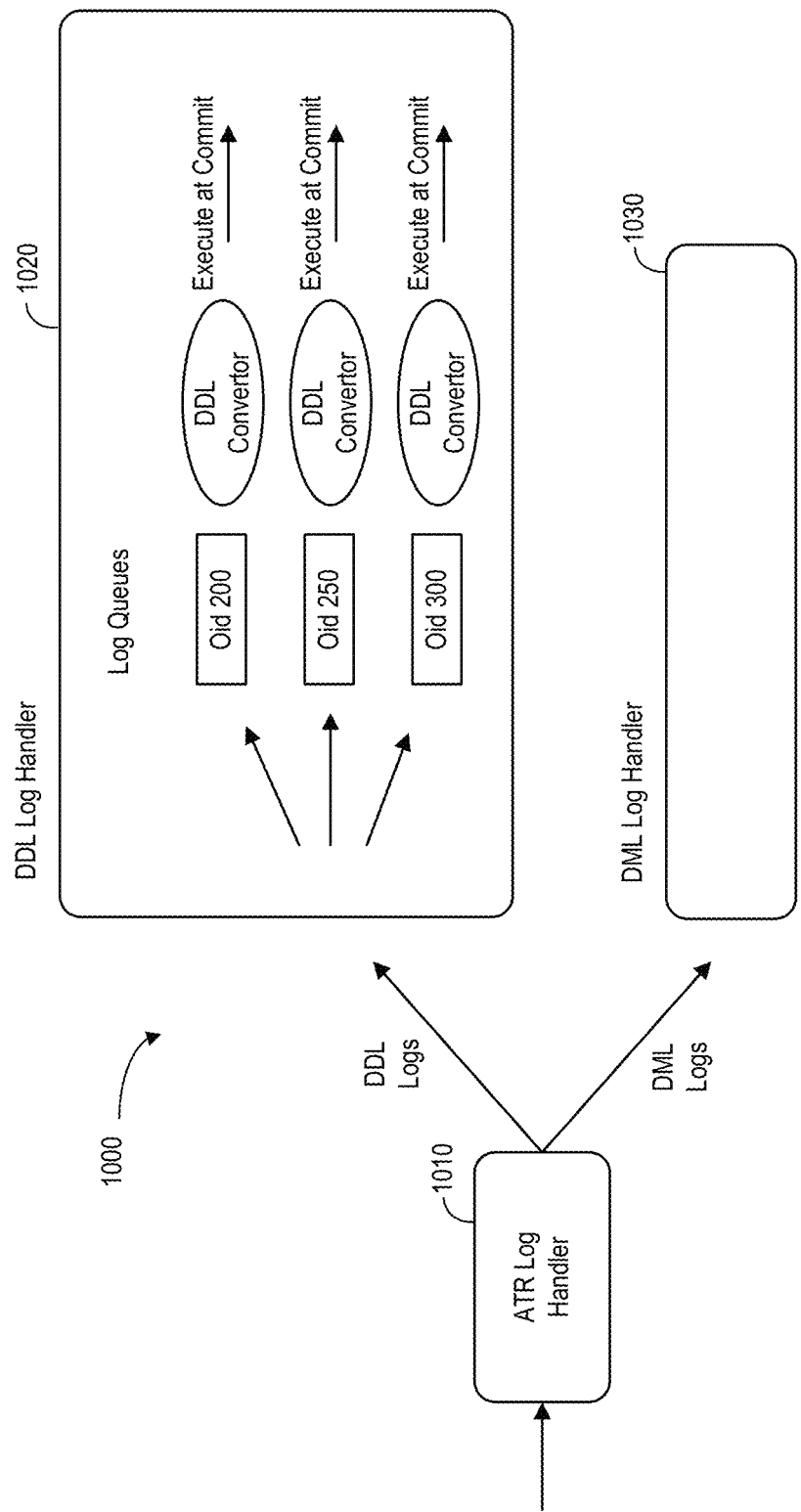
FIG. 10 represents a data definition language log replay according to some embodiments.

FIG. 10 represents a data definition language log replay 1000 according to some embodiments. In particular, an ATR log handler sends DDL logs to a DDL log handler 1020 and DML logs to a DML log handler 1030. The DDL log replay process may be as follows:

- Log queue for a replica table is created when the first DDL log is received. According to some embodiments, MDR::LogQueue::getInstance( )→register_queue( ) may be used in 'void TransactionContainer::pushDDL-Log( )'.
- DDL logs are queued in this queue until transaction commit. According to some embodiments, MDR::Log-Queue::getInstance( )→push( ) may be used in 'void TransactionContainer::pushDDLLog( )'.
- When transaction is committed, a DDL replayer is created with this queue and replay DDL(s): MDR::Replayer replayer(log_queue) and replayer.reply( ) in void TransactionContainer::replayDDLLog( )
- The log queue may then be destroyed. According to some embodiments, MDR::LogQueue::getInstance( )→unregister_queue( ) may be used in void TransactionContainer::replayDDLLog( ).

With respect to DDL generation, a single DDL statement can make multiple DDL logs(metadata redo logs). For example:

- 'alter table src add (b int)' makes a single metadata redo log.
- 'alter table src add (c int generated by default as identity (start with 10 maxvalue 100))' makes 2 metadata redo logs.
- 'alter table src add (i int unique)' makes 3 metadata redo logs.

So, the system cannot generate a DDL statement for each single metadata redo logs but must check if next metadata redo log from the queue is related to previous metadata redo log.

According to some embodiments, schema sync may be associated with DDL replay when RTR is re-activated. For example, DDL on source table may be replayed to replica table by transferring redo logs. But if there are DDL executions on source table during RTR deactivation, its redo logs are not transferred. And when RTR is re-activated, the system may not selectively get old metadata redo logs of source table (and as a result, the system cannot synchronize table metadata changes in this way).

Figure 11:
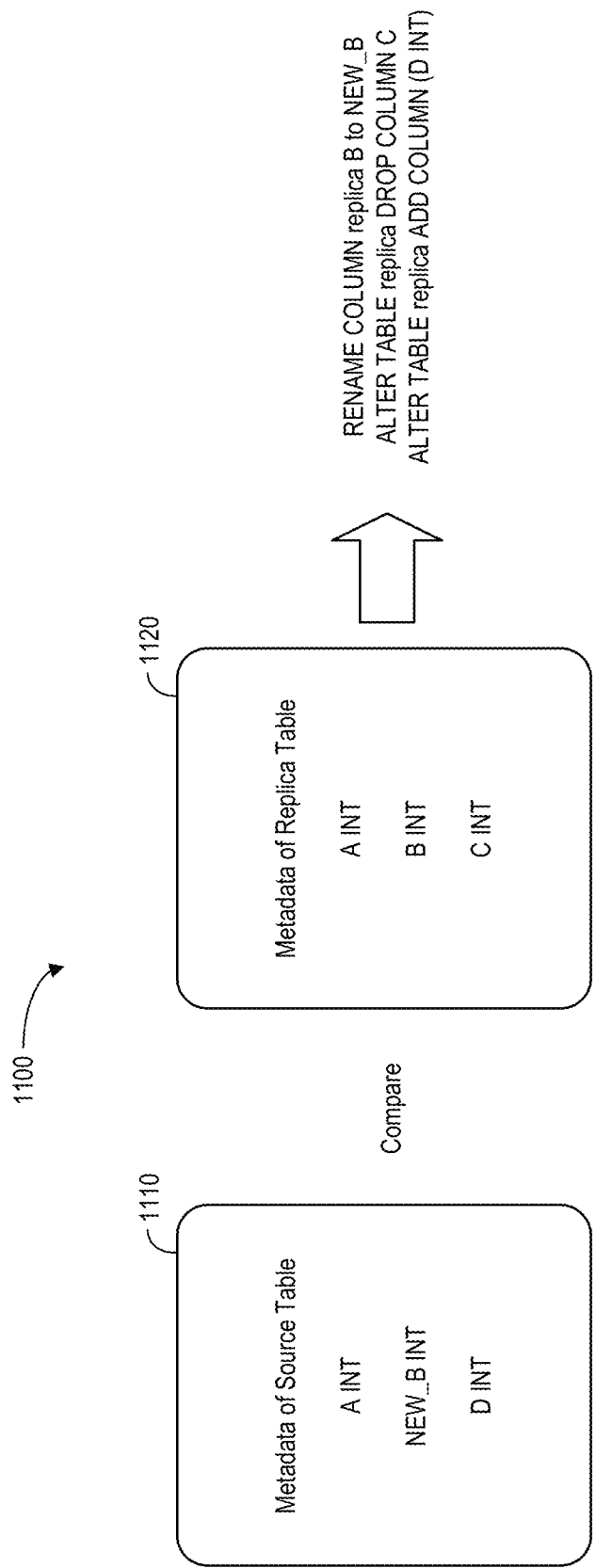
FIG. 11 illustrates a real-time table replication activation and generation of data definition language statements in accordance with some embodiments.

Therefore, when RTR is re-activated, current metadata of source table and replica table is compared and detected changes are generated as DDL and replayed to replica table. FIG. 11 illustrates 1100 a RTR activation and generation of DDL statements in accordance with some embodiments. In particular, metadata of a source table 1110 may be compared to metadata of a replica table 1120. By comparing metadata of source table 1110 and replica table 1120, schema synchronization is done as follows:

- Truncate replica table if "_truncatedCount" of source and replica tables are different (and set the same "_truncatedCount" value of source table to replica table).
- Drop/Rename indexes(constraints) of replica table. By comparing oids of indexes, replica indexes which don't exist in source table are dropped. If the name of indexes (not system generated name which starts with _SYS_) are different, index name is renamed (dropping index/constraint is done earlier than dropping columns, not to make exception when replaying DDLs).
- Drop/Rename/Alter columns of replica table. By comparing oids and names of columns, replica columns which don't exist in source table are dropped. Replica columns with same oid but different name or different column information are renamed and altered.
- Add columns to replica table (columns which only exist in source table are added to replica table).
- Create index or constraint on replica table. Indexes (constraints) only exist in source table are added to replica table (creating index/constraint should be done after all columns are synchronized).
- Alter partition if partitionSpec of source and replica tables are different.

Figure 12:
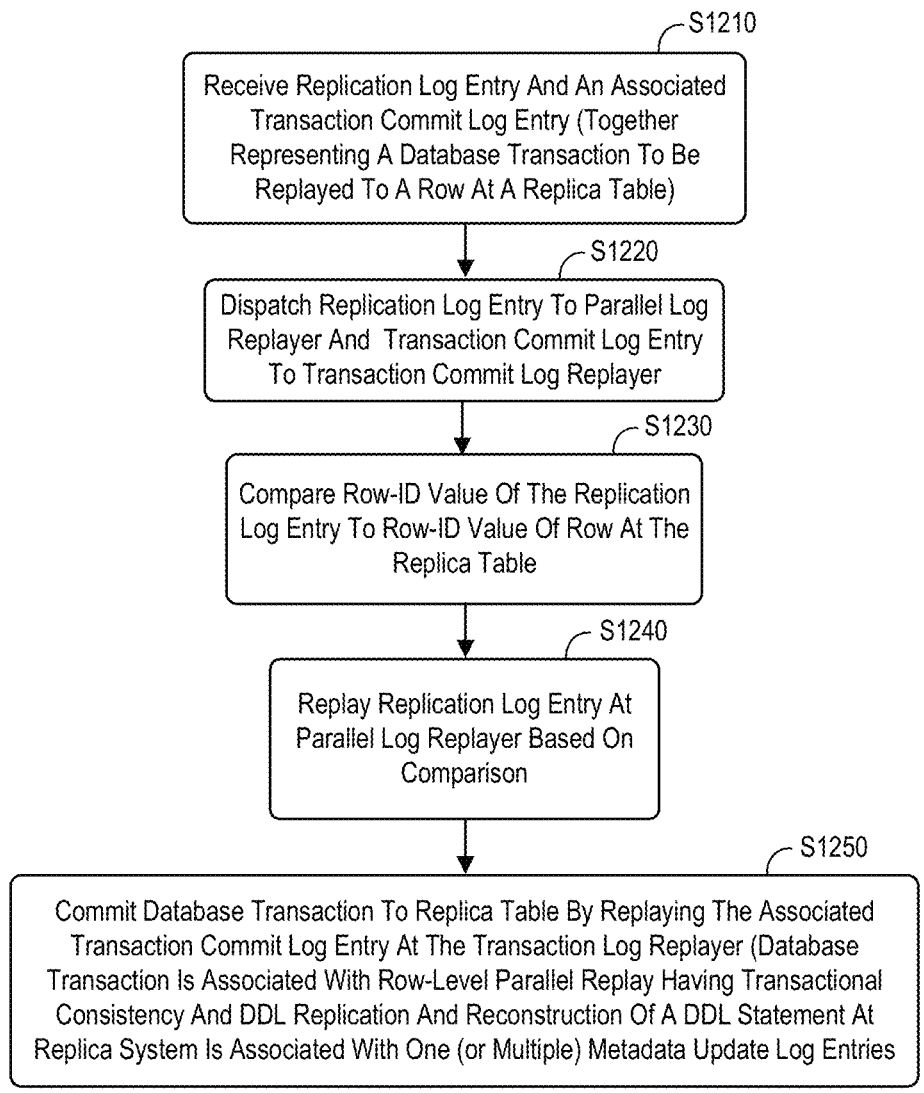
FIG. 12 is a real-time table replication method according to some embodiments.

FIG. 12 is a method that might performed by some or all of the elements of any embodiment described herein. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S1210, the system may receive a replication log entry and an associated transaction commit log entry. The replication log entry and the associated transaction commit log entry together may represent a database transaction to be replayed to a row at a replica table. According to some embodiments, the replication log entry has a row-ID value, and the row at the replica table has a row-ID value.

At S1220, the system may dispatch the replication log entry to a parallel log replayer and the associated transaction commit log entry to a transaction commit log replayer. The system may then compare the row-ID value of the replication log entry to the row-ID value of the row at the replica table at S1230. At S1240, the replication log entry is replayed at the parallel log replayer based on the comparison.

At S1250, the system may commit the database transaction to the replica table by replaying the associated transaction commit log entry at the transaction log replayer. According to some embodiments, the database transaction is associated with row-level parallel replay having transactional consistency. Moreover, DDL replication and reconstruction of a DDL statement at the replica system may be associated with one or multiple metadata update log entries.

Figure 13:
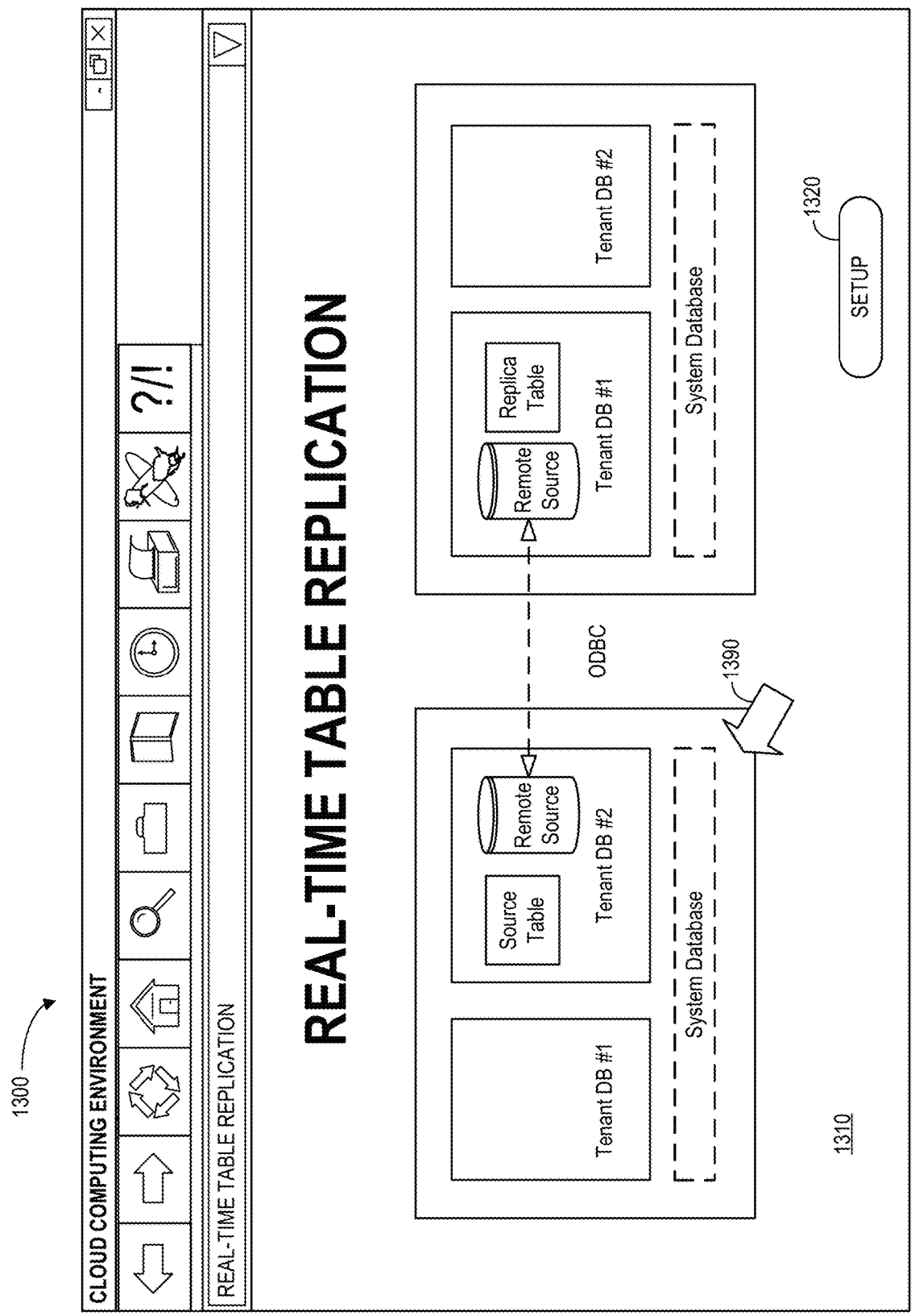
FIG. 13 is a real-time table replication display in accordance with some embodiments.

FIG. 13 is a RTR display 1300 in accordance with some embodiments. The display 1300 includes graphical elements 1310 of an RTR system including a source system and a replica system. Selection of a graphical element (e.g., via a touchscreen or computer mouse point 1390) may let an operator or administrator view additional information about that element (e.g., via a popup window) and/or adjust parameters associated with that element (e.g., table mappings or selections, replica system details, etc.). Moreover, selection of a "Setup" icon 1320 may let a user configure operation of the system.

Figure 14:
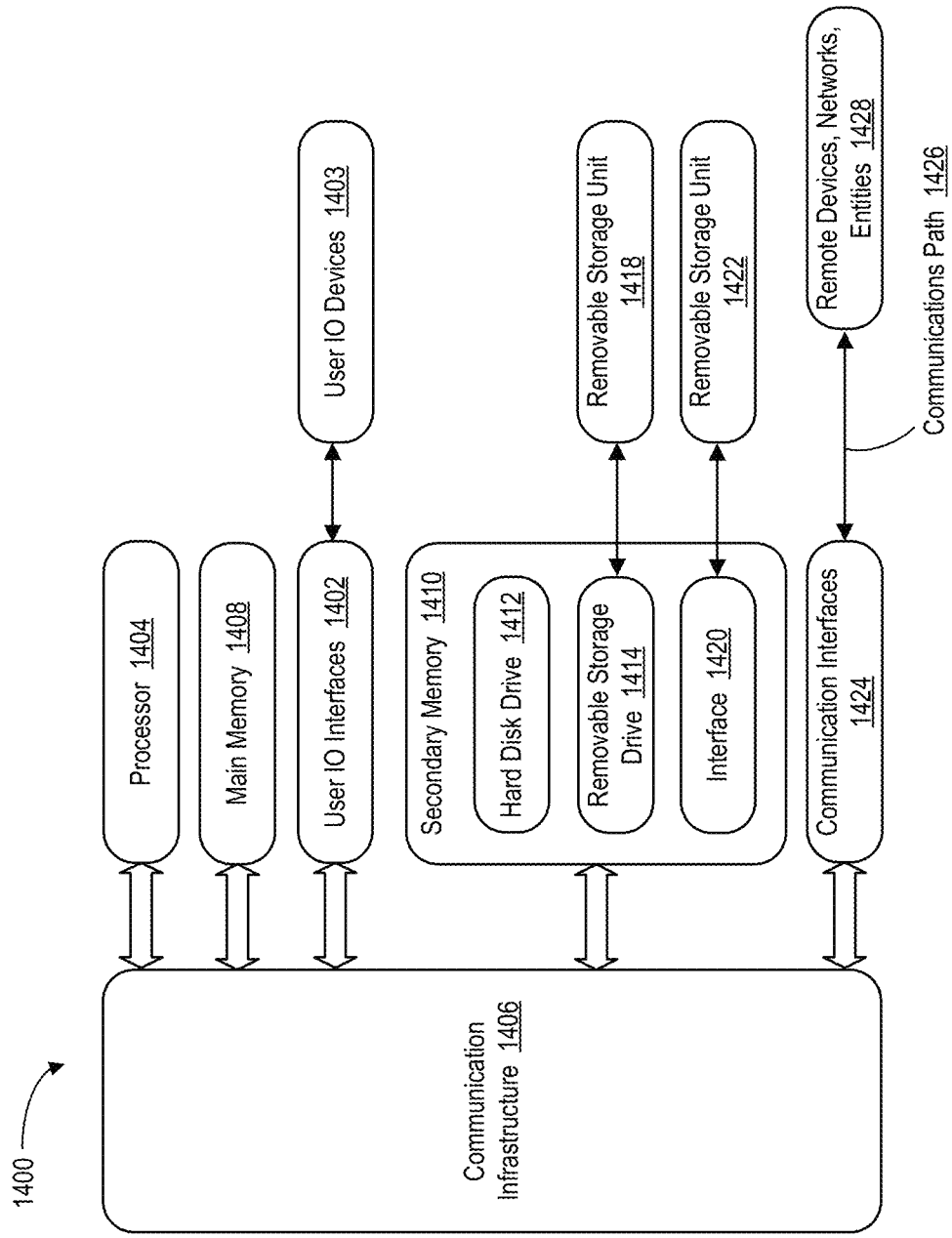
FIG. 14 is an example of a computer system useful for implementing various embodiments.

Various embodiments can be implemented, for example, using one or more well-known computer systems, such as computer system 1400 shown in FIG. 14. The computer system 1400 can be any well-known computer capable of performing the functions described herein. Computer system 1400 includes one or more processors (also called CPUs), such as a processor 1404. Processor 1404 is connected to a communication infrastructure or bus 1406.

One or more processors 1404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1400 also includes user input/output device(s) 1403, such as monitors, keyboards, pointing devices, etc., that communicate with communication infrastructure xx06 through user input/output interface(s) 1402.

Computer system 1400 also includes a main or primary memory 1408, such as Random Access Memory ("RAM"). Main memory 1408 may include one or more levels of cache. Main memory 1408 has stored therein control logic (i.e., computer software) and/or data.

Computer system 1400 may also include one or more secondary storage devices or memory 1410. Secondary memory 1410 may include, for example, a hard disk drive 1412 and/or a removable storage device or drive 1414. Removable storage drive 1414 may be a floppy disk drive, a magnetic tape drive, a compact disk drive, an optical storage device, tape backup device, and/or any other storage device/drive.

Removable storage drive 1414 may interact with a removable storage unit 1418. Removable storage unit 1418 includes a computer usable or readable storage device having stored thereon computer software (control logic) and/or data. Removable storage unit 1418 may be a floppy disk, magnetic tape, compact disk, DVD, optical storage disk, and/any other computer data storage device. Removable storage drive 1414 reads from and/or writes to removable storage unit 1418 in a well-known manner.

According to an exemplary embodiment, secondary memory 1410 may include other means, instrumentalities or other approaches for allowing computer programs and/or other instructions and/or data to be accessed by computer system 1400. Such means, instrumentalities or other approaches may include, for example, a removable storage unit 1422 and an interface 1420. Examples of the removable storage unit 1422 and the interface 1420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1400 may further include a communication or network interface 1424. Communication interface 1424 enables computer system 1400 to communicate and interact with any combination of remote devices, remote networks, remote entities, etc. (individually and collectively referenced by reference number 1428). For example, communication interface 1424 may allow computer system 1400 to communicate with remote devices 1428 over communications path 1426, which may be wired and/or wireless, and which may include any combination of LANs, WANs, the Internet, etc. Control logic and/or data may be transmitted to and from computer system 1400 via communication path 1426.

In an embodiment, a tangible apparatus or article of manufacture comprising a tangible computer useable or readable medium having control logic (software) stored thereon is also referred to herein as a computer program product or program storage device. This includes, but is not limited to, computer system 1400, main memory 1408, secondary memory 1410, and removable storage units 1418 and 1422, as well as tangible articles of manufacture embodying any combination of the foregoing. Such control logic, when executed by one or more data processing devices (such as computer system 1400), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 14. In particular, embodiments may operate with software, hardware, and/or operating system implementations other than those described herein.

Thus, embodiments may provide real-time cross-landscape database table replication in a secure, automatic, and accurate manner. Moreover, elastic scaling for an on-premise system may be supplemented with hybrid cloud resources. In addition, efficient data virtualization may be provided from multiple remote systems and/or tables (which may be associated with different binary software versions).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of applications and services, any of the embodiments described herein could be applied to other types of applications and services. In addition, the displays shown herein are provided only as examples, and any other type of user interface could be implemented.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system for Real-time Table Replication ("RTR") of a database transaction to a replica table, comprising:
   a computer memory; and
   at least one computer processor coupled to the memory and configured to:
      receive a replication log entry and an associated transaction commit log entry, the replication log entry and the associated transaction commit log entry together representing a database transaction to be replayed to a row at a replica table, the replication log entry having a row-ID value and the row at the replica table having a row-ID value,
      dispatch the replication log entry to a parallel log replayer and the associated transaction commit log entry to a transaction commit log replayer,
      compare the row-ID value of the replication log entry to the row-ID value of the row at the replica table,
      replay the replication log entry at the parallel log replayer based on the comparison, and
      commit the database transaction to the replica table by replaying the associated transaction commit log entry at the transaction log replayer, wherein the database transaction is associated with row-level parallel replay having transactional consistency and Data Dictionary Language ("DDL") replication and reconstruction of a DDL statement at the replica system is associated with one or multiple metadata update log entries, and further wherein push-based and early log shipping reduce propagation delay between a source system and a replica system.

2. The system of claim 1, wherein multiple replication object granularities are supported, including at least one of: (i) a set of tables, (ii) a table, (iii) a sub-table, (iv) one or more columns, and (v) one or more partitions.

3. The system of claim 1, wherein replication having a topology from multiple distinct remote source systems is supported as N-to-1 replication.

4. The system of claim 1, wherein replication having a topology from to multiple distinct remote replica systems is supported as 1-to-N replication.

5. The system of claim 1, wherein replication having a topology with a replica table being a source of another replica table is supported as chain replication.

6. The system of claim 1, wherein in-memory log replication does not rely on a store-and-forward mechanism.

7. The system of claim 1, wherein there is a separate transaction domain between the source system and the replica system.

8. The system of claim 1, wherein there is a separate metadata domain between the source system and the replica system.

9. The system of claim 1, wherein there are different software binary versions between the source system and the replica system.

10. A computer-implemented method for real-time table replication of a database transaction to a replica table, comprising:
   receiving, by at least one processor, a replication log entry and an associated transaction commit log entry, the replication log entry and the associated transaction commit log entry together representing a database transaction to be replayed to a row at a replica table, the replication log entry having a row-ID value and the row at the replica table having a row-ID value;
   dispatching, by the at least one processor, the replication log entry to a parallel log replayer and the associated transaction commit log entry to a transaction commit log replayer;
   comparing, by the at least one processor, the row-ID value of the replication log entry to the row-ID value of the row at the replica table;
   replaying, by the at least one processor, the replication log entry at the parallel log replayer based on the comparison; and
   committing, by the at least one processor, the database transaction to the replica table by replaying the associated transaction commit log entry at the transaction log replayer, wherein the database transaction is associated with row-level parallel replay having transactional consistency and Data Dictionary Language ("DDL") replication and reconstruction of a DDL statement at the replica system is associated with one or multiple metadata update log entries, and further wherein push-based and early log shipping reduce propagation delay between a source system and a replica system.

11. The method of claim 10, wherein multiple replication object granularities are supported, including at least one of: (i) a set of tables, (ii) a table, (iii) a sub-table, (iv) one or more columns, and (v) one or more partitions.

12. The method of claim 10, wherein replication having a topology from multiple distinct remote source systems is supported as N-to-1 replication.

13. The method of claim 10, wherein replication having a topology from to multiple distinct remote replica systems is supported as 1-to-N replication.

14. The method of claim 10, wherein replication having a topology with a replica table being a source of another replica table is supported as chain replication.

15. The method of claim 10, wherein in-memory log replication does not rely on a store-and-forward mechanism.

16. The method of claim 10, wherein there is a separate transaction domain between the source system and the replica system.

17. The method of claim 10, wherein there is a separate metadata domain between the source system and the replica system.

18. The method of claim 10, wherein there are different software binary versions between the source system and the replica system.

* * * * *